United States Patent
Chong et al.

(10) Patent No.: US 11,552,856 B2
(45) Date of Patent: Jan. 10, 2023

(54) DATA ANALYTICS METHOD AND APPARATUS

(71) Applicant: HUAWEI TECHNOLOGIES CO., LTD., Guangdong (CN)

(72) Inventors: Weiwei Chong, Shanghai (CN); Yang Xin, Shanghai (CN); Xiaobo Wu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 309 days.

(21) Appl. No.: 16/833,195

(22) Filed: Mar. 27, 2020

(65) Prior Publication Data

US 2020/0228413 A1    Jul. 16, 2020

Related U.S. Application Data

(63) Continuation of application No. PCT/CN2018/104115, filed on Sep. 5, 2018.

(30) Foreign Application Priority Data

Sep. 30, 2017 (CN) .......................... 201710915784.4

(51) Int. Cl.
  *G06F 15/173* (2006.01)
  *H04L 41/14* (2022.01)
  (Continued)

(52) U.S. Cl.
  CPC ............ *H04L 41/14* (2013.01); *G06K 9/6234* (2013.01); *H04L 41/0893* (2013.01);
  (Continued)

(58) Field of Classification Search
  CPC ..... H04L 41/14; H04L 41/0893; H04L 43/04; H04L 67/14; H04W 24/08
  (Continued)

(56) References Cited

U.S. PATENT DOCUMENTS

2014/0179270 A1* 6/2014 Anand ................ H04L 63/1425
                                                             455/410
2016/0099857 A1    4/2016 Begwani et al.
(Continued)

FOREIGN PATENT DOCUMENTS

| CN | 101854652 A | 10/2010 |
| CN | 103490849 A | 1/2014 |
| CN | 103473291 B | 1/2017 |

OTHER PUBLICATIONS

3GPP TS 23.501 V0.5.0 (May 2017), "3rd Generation Partnership Project; Technical Specification Group Services and System Aspects; System Architecture for the 5G System; Stage 2 (Release15)", May 2017, 145 pages.

(Continued)

*Primary Examiner* — Hannah S Wang
(74) *Attorney, Agent, or Firm* — Fish & Richardson P.C.

(57) ABSTRACT

Embodiments of this application provide example data analytics methods and example data analytics apparatuses. An example method carried out by a user plane data processing network element includes: obtaining information about at least one feature set from a data analytics network element, where information about each feature set in the information about the at least one feature set corresponds to at least one service type or at least one execution rule; obtaining a feature parameter of user plane data based on the information about the at least one feature set; sending the feature parameter to the data analytics network element; obtaining a response result of the feature parameter from the data analytics network element; obtaining, based on the response result, a service type associated with the user plane data or an execution rule associated with the user plane data.

18 Claims, 8 Drawing Sheets

(51) Int. Cl.
*G06K 9/62* (2022.01)
*H04L 41/0893* (2022.01)
*H04L 43/04* (2022.01)
*H04L 67/14* (2022.01)
*H04W 24/08* (2009.01)

(52) U.S. Cl.
CPC .............. *H04L 43/04* (2013.01); *H04L 67/14* (2013.01); *H04W 24/08* (2013.01)

(58) Field of Classification Search
USPC .......................................................... 709/223
See application file for complete search history.

(56) References Cited

U.S. PATENT DOCUMENTS

| | | | |
|---|---|---|---|
| 2019/0059067 A1* | 2/2019 | Lee ........................ | H04W 28/10 |
| 2019/0150219 A1* | 5/2019 | Wang ................ | H04W 36/0022 370/329 |
| 2019/0174573 A1* | 6/2019 | Velev .................... | H04W 76/38 |
| 2019/0364541 A1* | 11/2019 | Ryu ....................... | H04W 80/10 |
| 2020/0084657 A1* | 3/2020 | Lee ......................... | H04L 47/14 |

OTHER PUBLICATIONS

Extended European Search Report issued in European Application No. 18860414.4 dated Jul. 21, 2020, 10 pages.

Fallon et al., "Using the COMPA autonomous architecture for mobile network security," 2017 IFIP/IEEE Symposium on Integrated Network and Service Management (IM), IFIP, May 8, 2017, pp. 747-753.

Huawei, "Discussion about Big Data Driven Network Architecture," SA WG2 Meeting #121, S2-173192, May 15-19, 2017, Hangzhou, China, 11 pages.

PCT International Search Report and Written Opinion issued in International Application No. PCT/CN2018/104115 dated Nov. 30, 2018, 13 pages (with English translation).

* cited by examiner

DATA ANALYTICS METHOD AND APPARATUS

CROSS-REFERENCE TO RELATED APPLICATIONS

This application is a continuation of International Application No. PCT/CN2018/104115, filed on Sep. 5, 2018, which claims priority to Chinese Patent Application No. 201710915784.4, filed on Sep. 30, 2017. The disclosure of the aforementioned applications are hereby incorporated by reference in their entireties.

TECHNICAL FIELD

Embodiments of this application relate to the communications field, and more specifically, to a data analytics method and an apparatus.

BACKGROUND

In a 5th generation (5G) communications network, a network data analytics (NWDA) network element is introduced. The NWDA network element performs model training by using a big data analytics method, and analyzes data by using a trained model. However, a specific method for analyzing data by using the NWDA network element in the communications network is not provided in the prior art.

SUMMARY

Embodiments of this application provide a data analytics method and a data analytics apparatus, to analyze data by using a data analytics network element in a communications network.

According to a first aspect of this application, a data analytics method is provided and includes: obtaining, by a user plane data processing network element, information about at least one feature set from a data analytics network element, where information about each feature set in the information about the at least one feature set corresponds to at least one service type or at least one execution rule; receiving, by the user plane data processing network element, user plane data; obtaining, by the user plane data processing network element, a feature parameter of the user plane data based on the information about the at least one feature set; sending, by the user plane data processing network element, the feature parameter to the data analytics network element; obtaining, by the user plane data processing network element, a response result of the feature parameter from the data analytics network element; and obtaining, by the user plane data processing network element based on the response result, a service type associated with the user plane data or an execution rule associated with the user plane data. According to this embodiment of this application, data is analyzed by using the data analytics network element in a communications network.

In a first possible implementation of the first aspect, the obtaining, by the user plane data processing network element based on the response result, a service type associated with the user plane data or an execution rule associated with the user plane data includes: obtaining, by the user plane data processing network element based on the response result, the execution rule associated with the user plane data from a policy control network element; or obtaining, by the user plane data processing network element based on the response result, the execution rule associated with the user plane data from the data analytics network element.

In a second possible implementation of the first aspect, the method further includes: processing, by the user plane data processing network element, the user plane data based on the service type associated with the user plane data or the execution rule associated with the user plane data.

With reference to the second possible implementation of the first aspect, in a third possible implementation of the first aspect, the processing, by the user plane data processing network element, the user plane data based on the service type associated with the user plane data or the execution rule associated with the user plane data includes: forwarding, by the user plane data processing network element, the user plane data based on service priority information indicated in the execution rule associated with the user plane data; adding, by the user plane data processing network element, label information of the service type to the user plane data based on the service type associated with the user plane data or the execution rule associated with the user plane data; adding, by the user plane data processing network element, scheduling priority information to the user plane data based on the service type associated with the user plane data or the execution rule associated with the user plane data; or performing, by the user plane data processing network element, charging statistics on the user plane data based on the service type associated with the user plane data or the execution rule associated with the user plane data.

With reference to the second possible implementation of the first aspect, in a fourth possible implementation of the first aspect, the processing, by the user plane data processing network element, the user plane data based on the service type associated with the user plane data or the execution rule associated with the user plane data includes: determining, by the user plane data processing network element, that a destination address of the user plane data is an address of a terminal device and that the terminal device is in an idle mode; and sending, by the user plane data processing network element, paging priority information of the terminal device to a session management network element based on the service type associated with the user plane data or the execution rule associated with the user plane data.

With reference to any one of the possible implementations of the first aspect, the response result includes service type information associated with the user plane data and/or execution rule information associated with the user plane data.

With reference to any one of the possible implementations of the first aspect, in a fifth possible implementation of the first aspect, the obtaining, by the user plane data processing network element, a feature parameter of the user plane data based on the information about the at least one feature set includes: selecting, by the user plane data processing network element, information about part of the at least one feature sets from the information about the at least one feature set based on part of features; and obtaining, by the user plane data processing network element, the feature parameter of the user plane data, where the feature parameter corresponds to the information about the some feature sets.

With reference to the fifth possible implementation of the first aspect, in a sixth possible implementation of the first aspect, the part of features include internet protocol IP 5-tuple information of the user plane data.

With reference to any one of the possible implementations of the first aspect, the method further includes: obtaining, by the user plane data processing network element based on the information about the at least one feature set, information associated with the user plane data from another user plane data processing network element or a control plane network element; and the obtaining, by the user plane data processing network element, a feature parameter of the user plane data based on the information about the at least one feature set includes: obtaining, by the user plane data processing network element, the feature parameter of the user plane data based on the information about the at least one feature set and the associated information.

In a seventh possible implementation of the first aspect, the user plane data processing network element includes a feature extraction unit; and the obtaining, by the user plane data processing network element, a feature parameter of the user plane data based on the information about the at least one feature set includes: obtaining, by the feature extraction unit, the feature parameter of the user plane data based on information about at least part of the at least one feature sets in the information about the at least one feature set.

According to a second aspect of this application, a data analytics method is provided and includes: sending, by a data analytics network element, information about at least one feature set to a user plane data processing network element, where information about each feature set in the information about the at least one feature set corresponds to at least one service type or at least one execution rule; receiving, by the data analytics network element, a feature parameter of user plane data from the user plane data processing network element, where the information about the at least one feature set includes information that is about a feature set and that corresponds to the feature parameter; and determining, by the data analytics network element based on the feature parameter, service type information associated with the user plane data or execution rule information associated with the user plane data.

In a first possible implementation of the second aspect, the method further includes: selecting, by the data analytics network element based on part of features, the information about the at least one feature set from pre-obtained information of a feature set.

With reference to the first possible implementation of the second aspect, in a second possible implementation of the second aspect, the part of features include a data network name and/or identification information of a user plane function network element corresponding to a data network; and the selecting, by the data analytics network element based on part of features, the information about the at least one feature set from pre-obtained information of a feature set includes: selecting, by the data analytics network element from the pre-obtained information of the feature set, information that is about a feature set and that is consistent with the data network name and/or the identification information of the user plane function network element corresponding to the data network.

With reference to any one of the possible implementations of the second aspect, in a third possible implementation of the second aspect, the determining, by the data analytics network element based on the feature parameter, service type information associated with the user plane data or execution rule information associated with the user plane data includes: determining, by the data analytics network element based on the feature parameter and a matching algorithm corresponding to the feature parameter, the service type information associated with the user plane data or the execution rule information associated with the user plane data.

With reference to the third possible implementation of the second aspect, in a fourth possible implementation of the second aspect, the service type information associated with the user plane data includes a service type associated with the user plane data or indication information of a service type.

With reference to any one of the possible implementations of the second aspect, the method further includes: sending, by the data analytics network element, a response result of the feature parameter to the user plane data processing network element, where the response result includes the service type information associated with the user plane data or the execution rule information associated with the user plane data.

According to a third aspect of this application, a data analytics method is provided and includes: obtaining, by a policy control network element, information about at least one feature set from a data analytics network element, where information about each feature set in the information about the at least one feature set corresponds to at least one service type or at least one execution rule; and sending, by the policy control network element, information about at least some feature sets in the information about the at least one feature set to a user plane data processing network element.

In a first possible implementation of the third aspect, the method further includes: selecting, by the policy control network element based on part of features, the information about the at least part of the at least one feature sets from the information about the at least one feature set.

With reference to the first possible implementation of the third aspect, in a second possible implementation of the third aspect, the part of features include a data network name and/or identification information of a user plane function network element corresponding to a data network; and the selecting, by the policy control network element based on part of features, the information about the at least part of the at least one feature sets from the information about the at least one feature set includes: selecting, by the policy control network element from the information about the at least one feature set, information that is about a feature set and that is consistent with the data network name and/or the identification information of the user plane function network element corresponding to the data network.

With reference to any one of the possible implementations of the third aspect, the method further includes: sending, by the policy control network element, service type information corresponding to the information about the at least part of the at least one feature sets to the user plane data processing network element.

With reference to any one of the possible implementations of the third aspect, the method further includes: sending, by the policy control network element, an execution rule corresponding to the information about the at least part of the at least one feature sets to the user plane data processing network element.

With reference to any one of the possible implementations of the third aspect, the method further includes: obtaining, by the policy control network element, the service type information corresponding to the information about the at least part of the at least one feature sets from the data analytics network element; generating, by the policy control network element based on the obtained service type information, the execution rule corresponding to the information about the at least part of the at least one feature sets; and sending, by the policy control network element, the execution rule corresponding to the information about the at least part of the at least one feature sets to the user plane data processing network element.

According to a fourth aspect of this application, a data analytics method is provided and includes: obtaining, by a user plane data processing network element, information about a feature set from a data analytics network element, where the information about the feature set corresponds to a service type or an execution rule; receiving, by the user plane data processing network element, user plane data; obtaining, by the user plane data processing network element, a feature parameter of the user plane data based on the information about the feature set; sending, by the user plane data processing network element, the feature parameter to the data analytics network element; obtaining, by the user plane data processing network element, a response result of the feature parameter from the data analytics network element; and obtaining, by the user plane data processing network element based on the response result, a service type associated with the user plane data or an execution rule associated with the user plane data.

The fourth aspect of this application may further include the first to the fourth possible implementations of the first aspect.

According to a fifth aspect of this application, a data analytics method is provided and includes: sending, by a data analytics network element, information about a feature set to a user plane data processing network element, where the information about the feature set corresponds to a service type or an execution rule; receiving, by the data analytics network element, a feature parameter of user plane data from the user plane data processing network element, where the feature parameter corresponds to the information about the feature set; and determining, by the data analytics network element based on the feature parameter, service type information associated with the user plane data or execution rule information associated with the user plane data.

According to a sixth aspect of this application, a data analytics method is provided and includes: obtaining, by a policy control network element, information about a feature set from a data analytics network element, where the information about the feature set corresponds to a service type or an execution rule; and sending, by the policy control network element, the information about the feature set to a user plane data processing network element.

According to a seventh aspect of this application, a data analytics apparatus is provided and includes: a transceiver unit, configured to obtain information about at least one feature set from a data analytics network element, and configured to receive user plane data, where information about each feature set in the information about the at least one feature set corresponds to at least one service type or at least one execution rule; and a processing unit, configured to obtain a feature parameter of the user plane data based on the information about the at least one feature set, where the transceiver unit is further configured to send the feature parameter to the data analytics network element and obtain a response result of the feature parameter from the data analytics network element; and the processing unit is further configured to obtain, based on the response result, a service type associated with the user plane data or an execution rule associated with the user plane data.

According to an eighth aspect of this application, a data analytics apparatus is provided and includes: a transceiver unit, configured to send information about at least one feature set to a user plane data processing network element and receive a feature parameter of user plane data from the user plane data processing network element, where information about each feature set in the information about the at least one feature set corresponds to at least one service type or at least one execution rule, and the information about the at least one feature set includes information that is about a feature set and that corresponds to the feature parameter; and a processing unit, configured to determine, based on the feature parameter, service type information associated with the user plane data or execution rule information associated with the user plane data.

According to a ninth aspect of this application, a data analytics apparatus is provided and includes: a processing unit and a transceiver unit. The processing unit is configured to obtain information about at least one feature set from a data analytics network element by using the transceiver unit, where information about each feature set in the information about the at least one feature set corresponds to at least one service type or at least one execution rule. The processing unit is further configured to send information about at least part of the at least one feature sets in the information about the at least one feature set to a user plane data processing network element by using the transceiver unit.

In any one of the aspects or any one of the possible implementations above, the information about the feature set is a set of feature indexes.

In any one of the aspects or any one of the possible implementations above, the feature parameter is an eigenvector.

In any one of the aspects or any one of the possible implementations above, the feature parameter is a set of eigenvalues.

According to a tenth aspect of this application, a data analytics apparatus is provided and includes: a storage unit, configured to store a computer instruction; and a processing unit, configured to perform, based on the computer instruction stored in the storage unit, any one of the methods according to the first aspect to the sixth aspect and the possible implementations above.

According to an eleventh aspect of this application, a computer-readable storage medium is provided. The computer-readable storage medium stores an instruction, and when run on a computer, the instruction enables the computer to perform any one of the methods according to the first aspect to the sixth aspect and the possible implementations above.

According to a twelfth aspect of this application, a computer program product including an instruction is provided. When run on a computer, the instruction enables the computer to perform any one of the methods according to the first aspect to the sixth aspect and the possible implementations above.

DESCRIPTION OF EMBODIMENTS

The embodiments of this application may be applied to a long term evolution (LTE) network, a 5G or next generation network, a fixed network, a home NodeB network, a non-3GPP (such as Wi-Fi) accessed mobile network, or the like. In this application, an example in which the embodiments of this application are applied to the 5G network is used for description.

Figure 1:
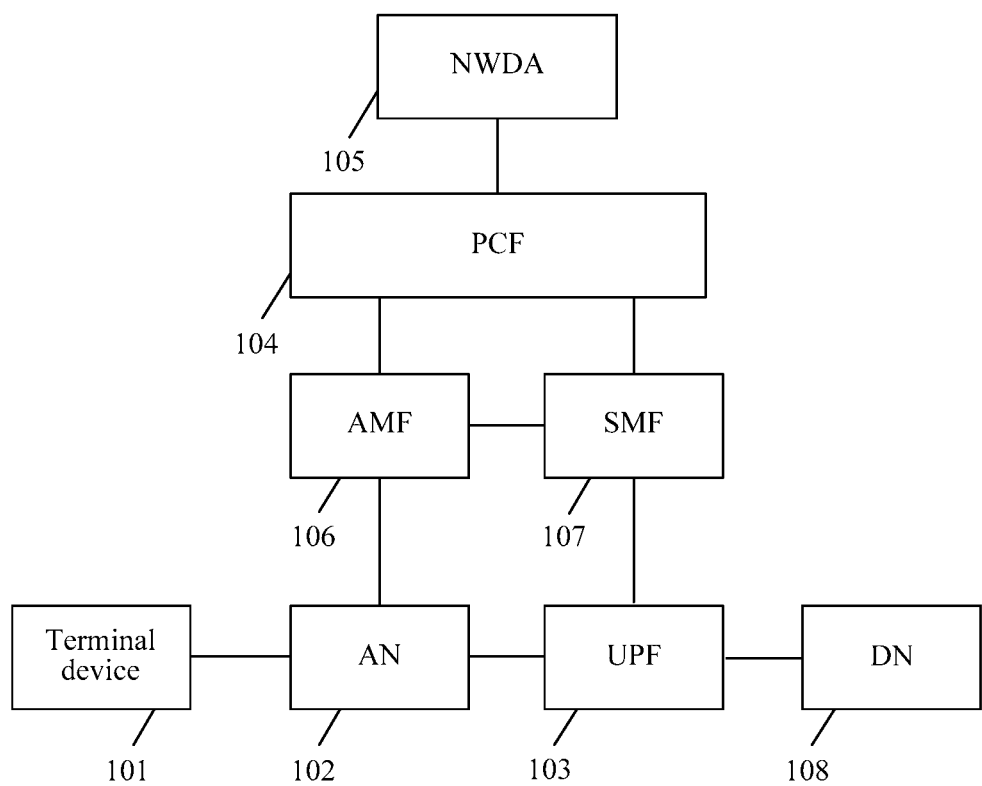
FIG. 1 is a schematic diagram of a communications system that implements an embodiment of this application.

FIG. 1 is a schematic diagram of a communications system that can implement an embodiment of this application. In the communications system, a terminal device 101 accesses a core network by using an access network (AN) device 102.

The terminal device 101 includes but is not limited to: user equipment (UE), a subscriber unit, a subscriber station, a mobile station, a remote station, a remote terminal device, a mobile terminal device, a user terminal device, a terminal device, a wireless communications device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, a processing device connected to a wireless modem, a vehicle-mounted device, a wearable device, a terminal device in the internet of things, a household appliance, a virtual reality device, a terminal device in a 5G network, a terminal device in a future evolved public land mobile network (PLMN), and the like.

The access network device 102 may be a device that communicates with the terminal device 101. The access network device may provide communication coverage for a specific geographic area, and may communicate with the terminal device that is located within the coverage area (a cell). The access network device 102 may communicate with any quantity of terminal devices. There may be a plurality of air interface connections between the access network device 102 and the terminal device 101. For example, there are two air interface connections between the access network device 102 and the terminal device 101, and the two air interface connections are respectively used to transmit a data flow A and a data flow B. The access network device may support communication protocols in different standards, or may support different communication modes. For example, the access network device 102 is an evolved NodeB (eNodeB), a wireless fidelity access point (WiFi AP), a worldwide interoperability for microwave access base station (WiMAX BS), or a radio controller in a cloud radio access network (CRAN); or the network device may be an access network device in the 5G network, an access network device in the future evolved PLMN, or the like.

The core network may include: a control plane function (CPF) network element, a user plane function (UPF) network element 103, a policy control function (PCF) network element 104, and an NWDA network element 105. The control plane function network element may include an access management function (AMF) network element 106 and a session management function (SMF) network element 107. Transmission of user plane data between the terminal device 101 and a data network (DN) 108 can be implemented by using the access network device 102 and the user plane function network element 103.

The PCF network element 104 has a policy control decision function, and provides a policy for a network. The NWDA network element 105 is used for big data learning and analytics. The AMF network element 106 is used for mobility management, lawful interception, access authorization and authentication, or the like. The SMF network element 107 is configured to implement session and bearer management, address allocation, and the like. The DN 108 is a network configured to transmit data. Specifically, the DN 108 may be an internet protocol (IP) multimedia subsystem (IMS) server, a packet data network (PDN), or an application server (App server).

It may be understood that in the communications system shown in FIG. 1, a function of each composition network element is merely an example. When each composition network element is applied to the embodiments of this application, not all functions are necessary.

"And/or" in the embodiments of this application describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

In the embodiments of this application, that a network element (for example, a network element A) obtains information from another network element (for example, a network element B) may mean that the network element A directly receives the information from the network element B, or may mean that the network element A receives the information from the network element B through another network element (for example, a network element C). When the network element A receives the information from the network element B through the network element C, the network element C may transparently transmit the information, or may process the information. For example, the network element C adds the information to different messages for transmission, or screens the information and sends only screened information to the network element A. Similarly, in various embodiments of this application, that the network element A sends the information to the network element B may mean that the network element A directly sends the information to the network element B, or may mean that the network element A sends the information to the network element B through another network element (for example, the network element C).

Figure 2:
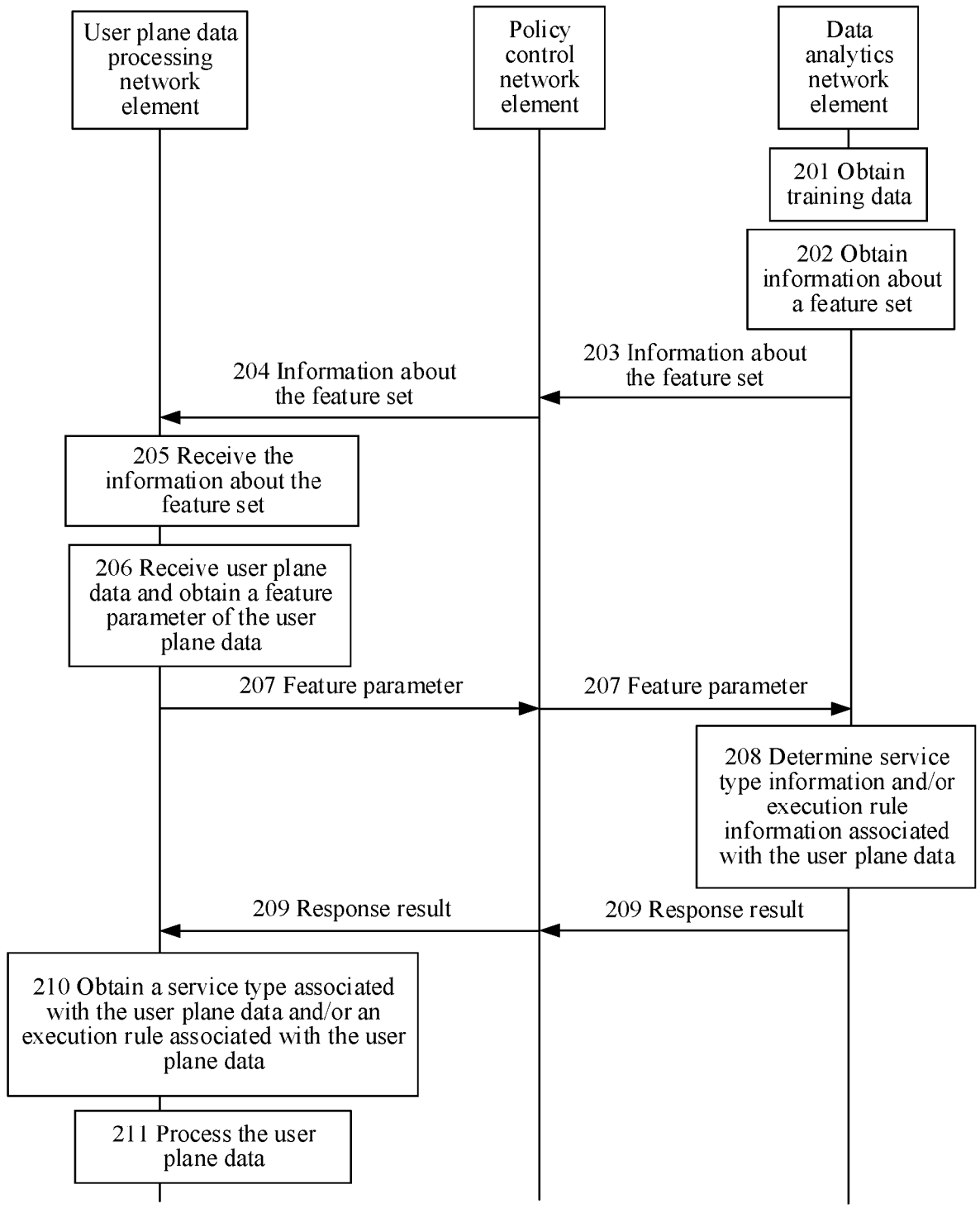
FIG. 2 is a schematic flowchart of a data analytics method according to a first embodiment of this application.

FIG. 2 is a schematic flowchart of a data analytics method according to a first embodiment of this application. The data analytics method includes the following steps.

201: A data analytics network element obtains training data.

The data analytics network element may be the NWDA network element in FIG. 1. The data analytics network element may alternatively be another network element having a network data analytics function. This is not limited herein.

The data analytics network element may separately obtain the training data from another network element, or the data analytics network element may obtain the training data from a same network element. Specifically, the another network element may be a telecommunication network device, or may be a third-party server. The telecommunication network device may be at least one of the following devices: a terminal device, an access network device, a control plane function network element (for example, an AMF network element or an SMF network element), a UPF network element, a PCF network element, a network management network element (for example, a business support system (BSS), an operation support system (OSS), or a management support system (MSS)), a unified data management (UDM) network element, and an IMS network element. The third-party server may be at least one of an App server, an OTT (over the top) server, and a vertical industry control and management center.

The data analytics network element may directly obtain the training data by exchanging data with another network element. Alternatively, the data analytics network element may indirectly obtain the training data by using another network element. For example, the data analytics network element obtains data from the third-party server by using a network exposure function (NEF) network element.

The data analytics network element may obtain the training data from another network element in real time, or the data analytics network element may obtain the training data when the data analytics network element and/or the another network element are/is idle.

The training data obtained by the data analytics network element may be original data. The training data obtained by the data analytics network element may alternatively be data pre-processed by the another network element. For example, for an objective of protecting user privacy, the application server removes sensitive information from the original data, and sends processed data to the data analytics network element.

The training data obtained by the data analytics network element may be network data, for example, an address, a cell identifier (cell ID), time information, or a network congestion condition of a terminal device. The training data obtained by the data analytics network element may alternatively be application data, for example, an IP 5-tuple, a size of user plane data, a user plane data interval, a service type, service experience, or an extended field. The data analytics network element may further associate the obtained application data with the network data, to obtain associated training data. For example, the data analytics network element associates the application data with the network data based on the address and/or the time information of the terminal device. The address of the terminal device may be an IP address, or may be an Ethernet address.

The data analytics network element may obtain the training data by using the service type as a granularity. For example, the data analytics network element obtains training data of a video service, training data of a payment service, or training data of a voice over long term evolution (VOLTE) service.

The data analytics network element may alternatively obtain the training data by using a network element as a granularity. For example, training data obtained from the terminal device may include: a terminal type, the address of the terminal device, a version of an operating system, a temperature of the terminal device, an electric quantity of the terminal device, cell radio channel quality measured by the terminal device, or the like; training data obtained from a session management network element may include: an identifier (identifier, ID) of the session management network element, the address of the terminal device, a data network name (DNN), or the like; training data obtained from a user plane function network element may include: an ID of the user plane function network element, a tunnel endpoint identifier (TEID), a congestion level, an IP 5-tuple, a size of user plane data, a quantity of user plane data, or the like; training data obtained from an access network device may include: a cell identifier (Cell ID), a quality of service (QoS) parameter, real-time radio channel quality (for example, a reference signal received power (RSRP), reference signal received quality (RSRQ), a signal to interference plus noise ratio (SINR)), a service switching threshold, a filtering coefficient, an antenna tilt, a carrier, a packet loss rate, a guaranteed bit rate (GBR), a maximum bit rate (MBR), a congestion level, or the like; and training data obtained from the third-party server may include: an IP 5-tuple, a start time, an end time, a service type, or the like.

202: The data analytics network element analyzes the training data and obtains information about a feature set.

The data analytics network element analyzes, by using a big data analytics method, the training data obtained in step 201 and obtains information about at least one feature set. The information about the feature set may be a specific feature set, or may be information corresponding to the feature set, for example, an index of the feature set. Information about each feature set in the information about the at least one feature set corresponds to at least one service type or at least one execution rule. An execution rule may be at least one of an execution policy (enforcement policy), a control policy, a charging policy, or a policy and charging control (PCC) rule. The PCC rule may include a quality of service policy.

The data analytics network element separately analyzes training data of various service types, to obtain information that is about a feature set and that corresponds to each service type. One service type may uniquely correspond to information about one feature set, or one service type may correspond to information about a plurality of feature sets. Information about one feature set may uniquely correspond to one service type, or information about one feature set may correspond to a plurality of service types. When information about one feature set corresponds to a plurality of service types, a corresponding service type may be determined with reference to another condition or feature other than the information about the feature set.

The data analytics network element may determine, based on the service type corresponding to the information about the feature set, execution rule information of the service type. The execution rule information of the service type is execution rule information corresponding to the information about the feature set. For example, when the service type is a payment service, a processing priority of the payment service is determined. In this application, the execution rule information may be a specific execution rule, or may be information related to the execution rule, for example, information used to obtain the execution rule. The data analytics network element may alternatively determine, based on content in the information about the feature set, the execution rule information corresponding to the information about the feature set. For example, the data analytics network element may determine, based on at least one of radio channel quality, a congestion level, a packet loss rate, and a switching threshold in the feature set, the execution rule corresponding to the feature set. The data analytics network element may determine, based on the training data such as the radio channel quality, the congestion level, the packet loss rate, or the switching threshold, the information related to the execution rule.

The data analytics network element may obtain a feature of a service granularity. For example, if a size of user plane data corresponding to training data of a service is a specific value or is within a specific range, the data analytics network element may use the user plane data size as a feature of the service. For another example, if user plane data corresponding to training data of a service is from a data network having one or part of features, the data analytics network element may use a name of the data network as another feature of the service.

The data analytics network element may obtain a feature of a terminal device granularity. For example, features of user plane data of a service corresponding to terminal devices produced by different vendors may be different. When the service of the different terminal device needs to be distinguished, the data analytics network element may use a terminal device type as a feature of the service. Optionally, the data analytics network element may distinguish terminal device types based on type allocation codes (TAC) in international mobile equipment identities (IMEI). Therefore, the data analytics network element may use the IMEI of the terminal device as a feature. For another example, features of user plane data of a service corresponding to terminal devices having different operating systems may be different. Therefore, the data analytics network element may also use a type of the operating system of the terminal device as a feature of the service.

The data analytics network element may further obtain a feature of a user granularity. For example, if a user is a business user, a terminal device owned by the user performs, in a fixed location range, a service for a long time. Therefore, the data analytics network element may use location information of the terminal device as a feature of the service. Optionally, the data analytics network element may obtain information about a public network address and information about a port number that are of the terminal device from the application server. The data analytics network element then may query for information about an internal network address corresponding to the public network address from a network address translation (NAT) network element. The data analytics network element obtains user identification information, location information, or the like corresponding to the information about the internal network address from a network management system.

Using a video service as an example, the data analytics network element analyzes the training data to obtain the following feature set:

<terminal device type, terminal device location, time, size of a first data packet in a data flow, average value of sizes of all data packets in the data flow, and entropy of the sizes of all the data packets in the data flow>.

Using a payment service as an example, the data analytics network element analyzes the training data to obtain the following feature set:

<terminal device type, terminal device location, cell identifier, time, average value of uplink and downlink time intervals of all data packets in a data flow, and entropy of the uplink and downlink time intervals of all the data packets in the data flow>.

It should be noted that in this application, feature sets of the video service and the payment service are merely examples for description for ease of understanding. The feature sets of the video service and the payment service in this application may alternatively be other content. This is not limited in this application.

In a possible implementation, the data analytics network element may aggregate feature sets corresponding to various service types to obtain a total feature set, and set an index for each feature in the total feature set. Based on the total feature set, the data analytics network element may obtain an index of the feature set corresponding to each service. Optionally, the data analytics network element may alternatively aggregate feature sets corresponding to some service types to obtain a total feature set corresponding to the some services, and set a feature index for each feature in the feature set.

For example, the data analytics network element may aggregate the feature sets of the video service and the payment service, to obtain a total feature set as shown in Table 1.

TABLE 1

| Feature | Feature index |
|---|---|
| Terminal device type | 1 |
| Terminal device location | 2 |
| Cell identifier | 3 |
| Time | 4 |
| Size of a first data packet in a data flow | 5 |
| Average value of sizes of all data packets in the data flow | 6 |
| Entropy of the sizes of all the data packets in the data flow | 7 |
| Average value of uplink and downlink time intervals of all the data packets in the data flow | 8 |
| Entropy of the uplink and downlink time intervals of all the data packets in the data flow | 9 |

Based on Table 1, it may be obtained that a set of feature indexes that corresponds to the video service is <1, 2, 4, 5, 6, 7>, and a set of feature indexes that corresponds to the payment service is <1, 2, 3, 4, 8, 9>.

In another possible implementation, if a feature index corresponding to a feature may be represented by a binary character, a set of feature indexes that corresponds to a service type may be represented by a binary character string. Assuming that a quantity of features in the total feature set is n, an index of a feature set corresponding to a service type may be represented by a binary character string of n bits. For example, when an $i^{th}$ bit in a binary character string corresponding to a service type is 1, it represents that a feature set corresponding to the service type includes an $i^{th}$ feature in the total feature set. Based on Table 1, using the foregoing video service and payment service as examples for description, a binary character string corresponding to the set of feature indexes <1, 2, 4, 5, 6, 7> of the video service is 110111100, and a binary character string corresponding to the set of feature indexes <1, 2, 3, 4, 8, 9> of the payment service is 111100011.

The data analytics network element may further obtain a matching algorithm corresponding to the information about each feature set. The matching algorithm may be obtained by using a big data analytics method for training data. For example, the data analytics network element obtains training data of a service type, and then obtains information about a feature set and a feature parameter (the feature parameter may be a set of eigenvalues, for example, an eigenvector) that correspond to the training data of the service type. The data analytics network element obtains, based on the obtained feature parameter, the matching algorithm corresponding to the information about the feature set by using the big data analytics method. The data analytics network element may alternatively obtain a matching algorithm corresponding to the information about each feature set by using a pre-configured method. Optionally, the matching algorithm may be a mathematical function or a data model.

In a possible implementation, the data analytics network element associates the matching algorithm with the service type or an execution rule corresponding to the information about the feature set. Association may be understood as establishment of a mapping relationship. A feature parameter of user plane data may be input into the matching algorithm. An output result of the matching algorithm is whether the feature parameter agrees with the matching algorithm. A service type associated with the user plane data corresponding to the input feature parameter may be determined based on the output result and the service type associated with the matching algorithm. For example, if the output result of the matching algorithm is 1, it represents that the input feature parameter agrees with the matching algorithm, and the service type associated with the matching algorithm is the service type associated with the corresponding user plane data. If the output result of the matching algorithm is 0, it represents that the input feature parameter does not agree with the matching algorithm, and the service type associated with the matching algorithm is not the service type associated with the corresponding user plane data.

In another possible implementation, the data analytics network element associates the output result of the matching algorithm with the service type or the execution rule. Association may be understood as establishment of a mapping relationship. For example, the output result of 0 corresponds to a first service type or a first execution rule, the output result of 1 corresponds to a second service type or a second execution rule, and output results of 2 to 4 corresponds to a third service type or a third execution rule. The feature parameter of the user plane data may be input into the matching algorithm, and the service type or the execution rule associated with the user plane data may be determined based on the output result of the matching algorithm. In this scenario, the output result of the matching algorithm may be service type information or execution rule information.

203: The data analytics network element sends the information about the at least one feature set to a policy control network element.

The policy control network element may be the PCF network element in FIG. 1, or may be another network element having a policy control function. This is not limited herein.

The data analytics network element may simultaneously send information that is about a feature set and that corresponds to a plurality of service types to the policy control network element, or the data analytics network element may separately send information that is about a feature set and that corresponds to a plurality of service types to the policy control network element. The data analytics network element may actively send the information about the feature set to the policy control network element, or may send the information about the feature set based on a request of the policy control network element. The data analytics network element may send the information about the feature set to the policy control network element in real time, or may send the information about the feature set to the policy control network element when a network is idle. This is not limited herein.

In a possible implementation, the data analytics network element may select, based on part of features, information about part of the at least one feature sets from information that is about the feature set and that is pre-obtained in step 202, and then send the information about the part of the at least one feature sets that is selected as the foregoing information about the at least one feature set to the policy control network element. The part of features may be one or part of features in the feature set, or may be a feature that is not in the feature set but associated with the feature set. For example, the part of features may be a DNN and/or identification information of a UPF network element corresponding to a data network. For example, the data analytics network element may receive a message from the session management network element. The message includes the DNN and/or the identification information of the UPF network element. The data analytics network element selects, from the pre-obtained information of the feature set, information that is about the feature set and that is consistent with the DNN and/or the identification information of the UPF network element.

The data analytics network element may further send information about the part of features that is associated with the information about the feature set to the policy control network element. The part of features may be one or part of features in the feature set, or may be a feature that is not in the feature set but associated with the feature set. For example, the part of features may be the DNN and/or the identification information of the UPF network element corresponding to the data network. The part of features may alternatively be address information of a server at which the service is located. The part of features may alternatively be IP 5-tuple information. The information about the part of features and the associated information of the feature set may be together sent to the policy control network element, or the information about the part of features and the information about the feature set may be separately sent to the policy control network element.

The data analytics network element may further send the service type information corresponding to the information about the at least one feature set to the policy control network element. The service type information may be a service type, or may be indication information of a service type, for example, at least one of a service type number, a number corresponding to the information about the feature set, and the output result of the matching algorithm. The service type information may be included in the corresponding information of the feature set and sent to the policy control network element, or the service type information may be sent independently to the policy control network element.

The data analytics network element may further send the execution rule information corresponding to the information about the at least one feature set to the policy control network element. The execution rule information may be information about a feature related to the execution rule, may be a specific execution rule, or may be indication information of the execution rule, for example, an execution rule number. This is not limited herein.

The following describes, by using Table 2 as an example, content sent from the data analytics network element to the policy control network element.

In Table 2, the information about the feature set is a set of feature indexes, and the set of feature indexes is numbered. One set of feature indexes corresponds to one service type. The service type information is the service type number. The execution rule information is a feature related to the execution rule, and the feature related to the execution rule is a radio channel quality switching threshold of the service. Part of features associated with the service type or the set of feature indexes are a network name. The data analytics network element may send the set of feature indexes in Table 2 to only the policy control network element. The data analytics network element may further send at least one of the number, the service type, the switching threshold, and the network name to the policy control network element.

TABLE 2

| Number | Service type (Service type) | Switching threshold | Network name | Set of feature indexes |
|---|---|---|---|---|
| 1 | Service type-1 | Switching threshold 1 | DNN-1 | {Index 1, index 2, index 3, . . . , index 8} |
| 2 | Service type-2 | Switching threshold 2 | DNN-1 | {Index 1, index 3, index 5, . . . , index 99} |
| 3 | Service type-3 | Switching threshold 2 | DNN-2 | {Index 1, index 4, index 7, . . . , index 19} |
| 4 | Service type-4 | Switching threshold 2 | DNN-2 | {Index 1, index 2, index 3, . . . , index 1000} |
| 5 | Service type-5 | Switching threshold 1 | DNN-3 | {Index 1, index 2, index 3, . . . , index 200} |

204: The policy control network element receives the information about the at least one feature set sent from the data analytics network element. The policy control network element sends information about at least part of the at least one feature sets in the at least one feature set to a user plane data processing network element.

The user plane data processing network element may be the user plane function network element in FIG. 1, may be an access network device, or may be another network element having a user plane data processing function. In this application, the policy control network element may send the information about the part of the at least one feature sets to the user plane data processing network element through the session management network element.

The policy control network element may send the received information of the at least one feature set to the user plane data processing network element. The policy control network element may also select, based on the part of features, the information about the part of the at least one feature sets from the received information of the at least one feature set. The part of features may be a feature in the feature set, or may be a feature that is not in the feature set but associated with the feature set. For example, the policy control network element receives the part of features from the session management network element. The part of features may be the DNN and/or the identification information of the UPF network element corresponding to the data network. The policy control network element selects, from the received information of the at least one feature set, the information that is about the feature set and that is consistent with the DNN and/or the identification information of the UPF network element as the information about the at least part of the at least one feature sets, and sends the information about the at least part of the at least one feature sets to the user plane data processing network element. For example, the policy control network element may receive a set of five feature indexes in Table 2 from the data analytics network element. If the policy control network element receives a session management message from the session management network element, a network name included in the session management message is DNN-1, and the policy control network element may send a set of two feature indexes that corresponds to DNN-1 to only the user plane data processing network element.

The policy control network element may receive the service type information from the data analytics network element. The service type information may be included in the corresponding information of the feature set, or the policy control network element may separately receive the information about the feature set and the service type information corresponding to the information about the feature set.

The policy control network element may not receive the service type information from the data analytics network element. The policy control network element may obtain the service type corresponding to the information about the feature set by analyzing the part of features in the feature set. For example, the information that is about the service type and that corresponds to the information about the feature set is determined based on the IP 5-tuple information.

The policy control network element may send the service type information corresponding to the information about the at least part of the at least one feature sets to the user plane data processing network element. The service type information and the information about the at least part of the at least one feature sets may be together sent, or the service type information and the information about the at least part of the at least one feature sets may be separately sent.

The policy control network element may generate, based on the obtained service type information, an execution rule for the information about the at least part of the at least one feature sets, that is, generate an execution rule for the service type corresponding to the information about the at least part of the at least one feature sets. The policy control network element may alternatively receive the execution rule from the data analytics network element. The execution rule corresponds to the information about the at least part of the at least one feature sets. The policy control network element may further receive a feature related to the execution rule from the data analytics network element, and determine, based on the received feature, the execution rule corresponding to the information about the at least part of the at least one feature sets. For example, the policy control network element may receive the switching threshold in Table 2 from the data analytics network element, and generate, based on the received switching threshold, an execution rule for the set of feature indexes that corresponds to the switching threshold. The policy control network element may simultaneously obtain the information about the feature set and execution rule information corresponding to the information about the feature set from the data analytics network element, or the policy control network element may separately receive the information about the feature set and the execution rule information corresponding to the information about the feature set from the data analytics network element.

The policy control network element may send the execution rule information corresponding to the information about the at least part of the at least one feature sets to the user plane data processing network element. The execution rule information and the information about the at least part of the at least one feature sets may be together sent, or the execution rule information and the information about the at least part of the at least one feature sets may be separately sent. This is not limited herein.

205: The user plane data processing network element receives the information about the at least part of the at least one feature sets from the policy control network element.

In a possible implementation, the user plane data processing network element may store the received information of the feature set. When the user plane data processing network element receives the set of feature indexes, the user plane data processing network element obtains the corresponding feature set based on the set of feature indexes.

In a possible implementation, when the user plane data processing network element cannot directly obtain the part of features in the information about the feature set, the user plane data processing network element may convert the part of features that cannot be directly obtained into features that can be directly obtained. For example, user plane data received by the user plane data processing network element may not necessarily include user identification information. If the feature set includes the user identification information, the user plane data processing network element may query an IP address pool, obtain an IP address corresponding to the user identification information, and then associate the IP address with the user identification information. Therefore, the user plane data processing network element may match the IP address in the received user plane data with an IP address in the feature set.

The user plane data processing network element may receive the service type information from the policy control network element. The service type information corresponds to the information that is about the feature set and that is received by the user plane data processing network element. For a form and a receiving manner of the service type information, refer to steps 203 to 205. Details are not described herein again.

The user plane data processing network element may further receive the execution rule information from the policy control network element. The execution rule information corresponds to the information that is about the feature set and that is received by the user plane data processing network element. For a form and a receiving manner of the execution rule information, refer to step 204. Details are not described herein again.

In a possible implementation, both of the data analytics network element and the user plane data processing network element may obtain the total feature set. Therefore, after the user plane data processing network element receives the index of the feature set, the user plane data processing network element obtains the feature set corresponding to the index of the feature set based on the total feature set and the index of the feature set. According to the method, a data throughput between network elements can be further reduced, and a requirement of transferring, between network elements each time, a definition of a feature associated with a service can be avoided. Optionally, the data analytics network element may synchronize the total feature set with the user plane data processing network element. For example, the data analytics network element sends the total feature set to the user plane data processing network element. The data analytics network element may synchronize the total feature set with the user plane data processing network element in real time, or may synchronize the total feature set periodically. The data analytics network element and the user plane data processing network element may alternatively obtain the total feature set in a pre-configured manner.

Steps 203 and 204 are optional steps. Through a service-oriented interface, the data analytics network element also sends, through the session management network element, at least one of the information about the at least one feature set, the service type information corresponding to the information about the feature set, and the execution rule information corresponding to the information about the feature set to the user plane data processing network element.

206: The user plane data processing network element receives the user plane data and obtains a feature parameter of the user plane data based on the received information of the at least part of the at least one feature sets.

In this application, the user plane data may be a data packet.

If the user plane data processing network element receives the feature set, after the user plane data processing network element receives the user plane data, the user plane data processing network element obtains the feature parameter of the user plane data based on the received feature set. If the user plane data processing network element receives the set of feature indexes, after the user plane data processing network element receives the user plane data, the user plane data processing network element determines, based on a feature index, a feature corresponding to the index, and then obtains the feature parameter that is of the user plane data and that corresponds to the feature. Therefore, the user plane data processing network element may obtain the feature parameter of the user plane data, and the feature parameter corresponds to the received set of feature indexes.

When the user plane data processing network element receives information about a plurality of feature sets, the user plane data processing network element may obtain a plurality of feature parameters of the user plane data. The plurality of feature parameters respectively correspond to the received information of the plurality of feature sets. In a possible implementation, after receiving the user plane data, the user plane data processing network element may select, based on the part of features, the information about the part of the at least one feature sets from the received information of the feature set. The user plane data processing network element then obtains the feature parameter of the user plane data. The feature parameter corresponds to the selected information of the part of the at least one feature sets. The part of features may be a feature in the feature set, or may be a feature that is not in the feature set but associated with the feature set. For example, the part of features may be IP 5-tuple information. The user plane data processing network element obtains the information about the feature set from the data analytics network element and obtains the IP 5-tuple information corresponding to the information about the feature set. Specifically, the part of features may be an IP address and/or a port number. The user plane data processing network element selects, from the received information of the feature set, information that is about a feature set and that is consistent with the IP address and/or the port number corresponding to the user plane data.

When the user plane data processing network element obtains a feature parameter of the user plane data, the user plane data processing network element may sequentially obtain feature parameters of the user plane data that correspond to feature sets. Alternatively, the user plane data processing network element may first obtain a feature parameter of the part of features in the feature set. If the feature parameter does not meet a preset condition, the user plane data processing network element stops obtaining the feature parameter that is of the user plane data and that corresponds to the feature set. For example, when the feature set sequentially includes the following features: a size, an interval, entropy, an IP address, a port number that are of the user plane data, the user plane data processing network element may first obtain the IP address and the port number of the user plane data that are in an IP 5-tuple. If the IP address and the port number of the user plane data that are in the IP 5-tuple do not meet the preset condition, the user plane data processing network element stops obtaining the feature parameter of the feature set.

In a possible implementation, if the feature set includes a feature that cannot be obtained by the user plane data processing network element, the user plane data processing network element may obtain a feature parameter corresponding to the feature from another network element (for example, another user plane data processing network element or a control plane network element). In this application, the feature parameter corresponding to the feature that cannot be obtained by the user plane data processing network element is referred to as information associated with the user plane data. For example, if the feature set includes the location information of the terminal device, the user plane data processing network element obtains the location information of the terminal device from the access network device. The location information of the terminal device is a type of information associated with the user plane data. Specifically, the user plane data processing network element may request the access network device to send the location information of the terminal device. The user plane data processing network element may alternatively subscribe to the location information of the terminal device from the access network device. Certainly, the user plane data processing network element may alternatively obtain the location information of the terminal device from the session management network element. The user plane data processing network element aggregates a feature parameter obtained by the user plane data processing network element and feature parameters obtained from other network elements, to obtain the feature parameter of the user plane data.

The feature parameter may be an actual value that is of the user plane data and that corresponds to the feature, or may be a processed value, for example, a normalized value or a quantized value. In this application, the feature parameter may alternatively be specific content of the feature, for example, a DNN or a type of terminal device, but may not necessarily be a specific value. In a possible implementation, the feature parameter of the user plane data may be represented in a form of an eigenvector.

207: The user plane data processing network element sends the feature parameter of the user plane data to the data analytics network element.

The user plane data processing network element sends the feature parameter obtained in step 206 to the data analytics network element. Specifically, the user plane data processing network element may send the obtained feature parameter to the data analytics network element through the session management network element and the policy control network element. Optionally, the user plane data processing network element may alternatively send the obtained feature parameter to the data analytics network element through the session management network element and a service-oriented interface between the session management network element and the data analytics network element.

Optionally, the user plane data processing network element may further send the associated information of the feature parameter, for example, a number of the information about the feature set, to the data analytics network element.

208: The data analytics network element determines, based on feature parameter, service type information and/or execution rule information associated with the user plane data.

After receiving the feature parameter of the user plane data, the data analytics network element determines, based on the feature parameter and the matching algorithm obtained in step 202, the service type information or the execution rule information associated with the user plane data. The service type information may be a specific service type, or may be indication information of a service type. For details, refer to step 203. The execution rule information may be a specific execution rule, or may be a feature related to an execution rule. For details, refer to step 203. In a possible implementation, when receiving a plurality of feature parameters, the data analytics network element may input each feature parameter into a corresponding matching algorithm, and then determine, based on an output result of the matching algorithm, the service type information or the execution rule information associated with the user plane data. In this embodiment of this application, the matching algorithm corresponding to the feature parameter is the matching algorithm corresponding to the information that is about the feature set and that corresponds to the feature parameter. Optionally, the corresponding matching algorithm may be determined by using the associated information of the feature parameter. For example, the associated information of the feature parameter may be the number corresponding to the information about the feature set (for example, the number in Table 2). In another possible implementation, when receiving a plurality of feature parameters, the data analytics network element may alternatively input all feature parameters into a plurality of corresponding matching algorithms pre-obtained by the data analytics network element, and then determine, based on output results of the matching algorithms, the service type information or the execution rule information associated with the user plane data.

An example is used below for description with reference to Table 2.

The data analytics network element may receive, from the user plane data processing network element, an eigenvector 1 and an eigenvector 2 corresponding to sets, with numbers of 1 and 2, of feature indexes. The data analytics network element inputs the eigenvector 1 into a matching algorithm 1 corresponding to the set, with the number of 1, of feature indexes, and an obtained output result is 0. The data analytics network element inputs the eigenvector 2 into a matching algorithm 2 corresponding to the set, with the number of 2, of feature indexes, and an obtained output result is 1. The data analytics network element may use a service type 2 associated with the matching algorithm 2 as the service type associated with the user plane data.

Optionally, the data analytics network element may also determine, based on the service type information associated with the user plane data, the execution rule information corresponding to the user plane data. For details, refer to step 202.

209: The data analytics network element sends a response result of feature parameter to the user plane data processing network element.

The response result may include the service type information and/or the execution rule information of the user plane data.

The data analytics network element may send the response result of the feature parameter to the user plane data processing network element through the policy control network element and the session management network element. Through the service-oriented interface, the data analytics network element may alternatively send the response result of the feature parameter to the user plane data processing network element through the session management network element.

The response result may include the service type associated with the user plane data, for example, the service type that is associated with the user plane data and that is determined by the data analytics network element in step 208. Alternatively, the response result may include the indication information of the service type associated with the user plane data, for example, the number of the set of feature indexes (for example, the number 2 in step 208) or a number of the service type. Alternatively, the response result may include the feature parameter corresponding to the service type associated with the user plane data, for example, the eigenvector 2 in step 208. Optionally, the response result may further include a result of determining whether the feature parameter agrees with the corresponding matching algorithm, for example, the output result 0 or 1 of the matching algorithm in step 208.

Optionally, after receiving the response result, the policy control network element may generate, based on the response result, the corresponding execution rule information for the service type associated with the user plane data. For details, refer to step 203. The policy control network element then sends the generated execution rule information to the user plane data processing network element.

Optionally, the response result may also include the execution rule information corresponding to the user plane data. The data analytics network element may determine, based on the service type information associated with the user plane data, the execution rule information corresponding to the user plane data. For details, refer to step 202.

210: The user plane data processing network element obtains the response result of the feature parameter from the data analytics network element, and obtains, based on the response result, the service type associated with the user plane data and/or the execution rule associated with the user plane data.

The user plane data processing network element may receive the response result of the feature parameter from the data analytics network element through the policy control network element and the session management network element. If the response result includes the service type, a to-be-received service type is determined as the service type associated with the user plane data. If the response result includes the indication information of the service type, the service type associated with the user plane data is obtained based on the indication information.

The user plane data processing network element may obtain, based on the service type information associated with the user plane data, the execution rule associated with the user plane data. The user plane data processing network element may also obtain, based on the response result, the execution rule associated with the user plane data from the policy control network element. For example, the user plane data processing network element obtains the execution rule from the policy control network element based on the service type information included in the response result, or the user plane data processing network element may obtain the execution rule associated with the user plane data directly from the response result.

211: The user plane data processing network element processes the user plane data based on the service type associated with the user plane data and/or the execution rule associated with the user plane data.

In a possible implementation, the user plane data processing network element processes the user plane data based on the service type associated with the user plane data. For example, the user plane data processing network element adds label information of the service type to the user plane data based on the service type associated with the user plane data. Alternatively, the user plane data processing network element forwards the user plane data based on service priority information. Alternatively, the user plane data processing network element adds scheduling priority information to the user plane data based on the service type associated with the user plane data. Alternatively, the user plane data processing network element determines that a destination address of the user plane data is an address of the terminal device and that the terminal device is in an idle mode, and the user plane data processing network element sends paging priority information of the terminal device to the session management network element based on the service type associated with the user plane data. Alternatively, the user plane data processing network element performs charging statistics on the user plane data based on the service type associated with the user plane data.

In another possible implementation, the user plane data processing network element processes the user plane data based on the execution rule associated with the user plane data. For example, the user plane data processing network element forwards the user plane data based on service priority information indicated in the execution rule. Alternatively, the user plane data processing network element adds label information of the service type to the user plane data based on the execution rule. Alternatively, the user plane data processing network element adds scheduling priority information to the user plane data based on the execution rule. Alternatively, the user plane data processing network element determines that a destination address of the user plane data is an address of the terminal device and that the terminal device is in an idle mode, and the user plane data processing network element sends paging priority information of the terminal device to the session management network element based on the execution rule. Alternatively, the user plane data processing network element performs charging statistics on the user plane data based on the execution rule associated with the user plane data.

In this embodiment, the user plane data processing network element obtains the information about the at least one feature set from the data analytics network element. The user plane data processing network element obtains, based on the received information of the feature set, the service type associated with the user plane data or the execution rule associated with the user plane data, to analyze data by using the data analytics network element in a communications network. Furthermore, to obtain the service type or the execution rule associated with the user plane data by using the big data analytics method, deep packet inspection (DPI) is not required on the user plane data. The method in this embodiment is simpler. Still furthermore, in this embodiment, the user plane data processing network element obtains, based on the received information of the feature set, the service type associated with the user plane data or the execution rule associated with the user plane data, to prevent the data analytics network element from sending the matching algorithm to the user plane data processing network element. Therefore, network congestion caused by frequent updates of the matching algorithm can be prevented.

Figure 3:
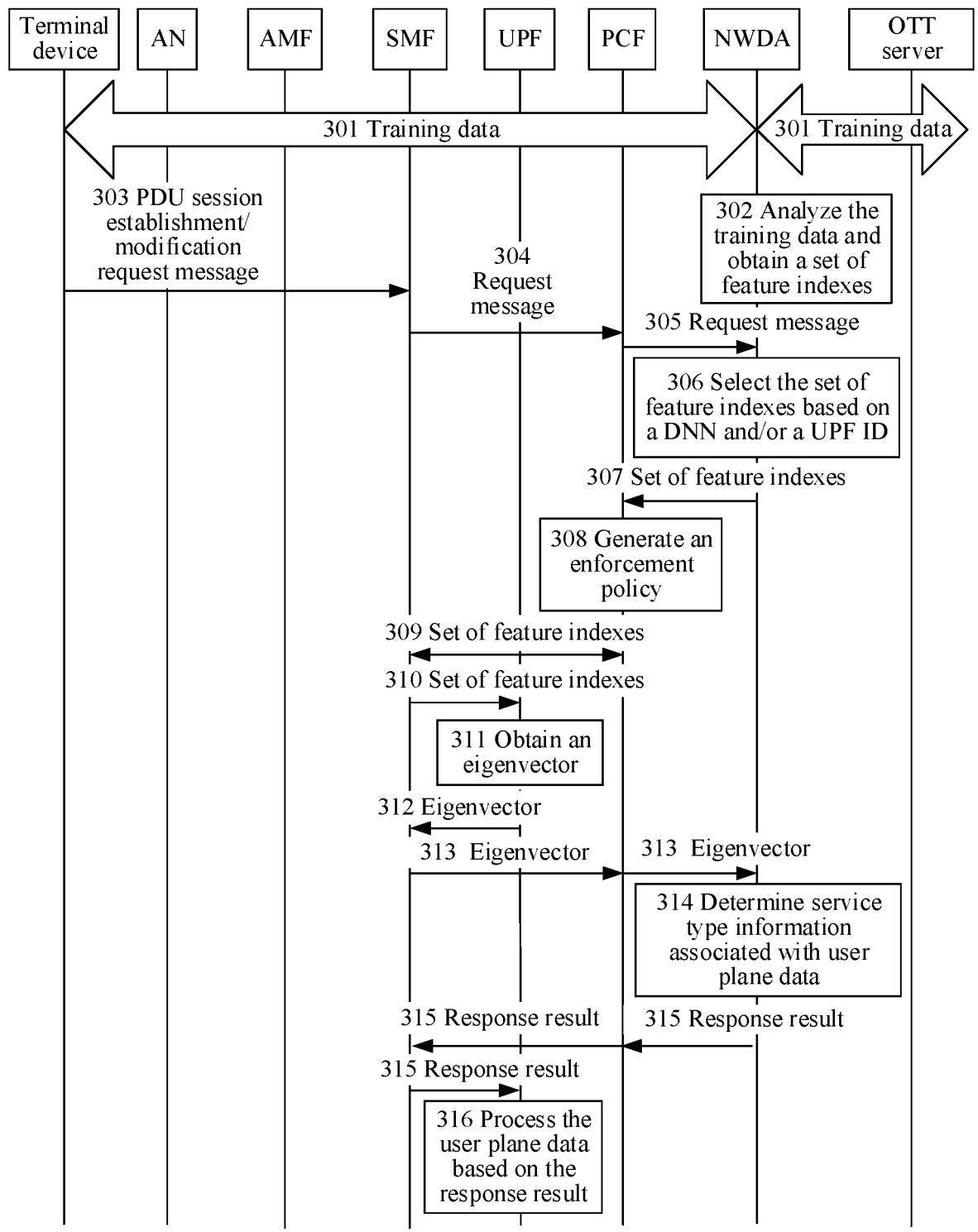
FIG. 3 is a schematic flowchart of a data analytics method according to a second embodiment of this application.

FIG. 3 is a schematic flowchart of a data analytics method according to a second embodiment of this application. In this embodiment, descriptions are made by using examples in which a data analytics network element is an NWDA network element, a user plane data processing network element is a UPF network element, a third-party server is an OTT server, information about a feature set is a set of feature indexes, and a feature parameter is an eigenvector. In this embodiment, the NWDA network element sends the information about the feature set to the UPF network element by using a packet data unit (PDU) session establishment/modification process that is initiated by UE. For a part that is of this embodiment and that is the same as that in the second embodiment, refer to the descriptions in the second embodiment. The data analytics method in this embodiment includes the following steps.

301: The NWDA network element obtains training data.

For a method for the NWDA network element to obtain the training data, refer to step 201. Details are not described herein again.

302: The NWDA network element analyzes the training data and obtains a set of feature indexes.

For this step, specifically refer to step 202. Details are not described herein again.

303: A terminal device requests, through an AMF network element, an SMF network element to initiate a PDU session establishment/modification process.

For this step, refer to a process in which a terminal device initiates a PDU session establishment/modification request in the prior art.

304: The SMF network element sends a request message to a PCF network element, to request an execution rule related to a PDU session. The execution rule related to the PDU session may be at least one of an enforcement policy, a control policy, a charging policy, and policy and charging control policy.

For this step, refer to a PDU connectivity access network (PDU-CAN) session establishment/modification process that is initiated by the SMF in the prior art.

Optionally, the request message includes a data network name (DNN) of a service requested by the terminal device and/or a user plane function identifier (UPF ID) that is associated with a data network.

305: The PCF network element sends the request message to the NWDA network element, to request the set of feature indexes.

Optionally, the requested set of feature indexes is a set of feature indexes that corresponds to a service type of a service requested by the terminal device.

Optionally, the request message includes a data network name of the service requested by the terminal device and/or a user plane function identifier associated with a data network, that is, the DNN and/or the UPF ID that are/is received by the PCF network element in step 304.

306: After receiving the request message sent from the PCF network element, the NWDA network element selects a set of feature indexes, which is consistent with the received DNN and/or UPF ID, from the set of feature indexes that is obtained in step 302.

In a possible implementation, a feature set corresponding to the set of feature indexes includes the DNN and/or the UPF ID. In another possible implementation, a feature set corresponding to the set of feature indexes does not include the DNN and/or the UPF ID. However, the DNN and/or the UPF ID are/is associated with the set of feature indexes.

Step 306 is an optional step. After receiving the request message sent from the PCF network element, the NWDA network element may not perform step 306 but directly perform step 307.

307: The NWDA network element sends the set of feature indexes to the PCF network element.

When the NWDA network element performs step 306, the NWDA network element sends the set of feature indexes that is selected by the NWDA network element in step 306. When the NWDA network element does not perform step 306, the NWDA network element sends a preset set of feature indexes. Optionally, the preset set of feature indexes may be a set of all feature indexes that is obtained by the NWDA network element, or may be a set of feature indexes that is determined by the NWDA network element based on a current network condition. For a manner in which the NWDA network element sends the set of feature indexes to the PCF network element, specifically refer to the descriptions of step 203.

In step 307, the NWDA network element may further send service type information corresponding to the set of feature indexes to the PCF network element. For details, refer to step 203. The NWDA network element may further send a feature associated with the set of feature indexes, for example, the DNN in Table 2, to the PCF network element.

In a possible implementation, the NWDA network element sends a response message of the request message in step 305 to the PCF network element. The response message includes the foregoing content sent from the NWDA network element to the PCF network element.

308: The PCF network element generates an execution rule based on the service type information.

The PCF network element generates, based on the received service type information (for example, a service type), an execution rule corresponding to the service type (for example, a quality of service policy).

Optionally, the PCF network element may further select an execution rule from the generated execution rule and the execution rule received from the NWDA network element.

309: The PCF network element sends the set of feature indexes to the SMF network element.

The set of feature indexes that is sent from the PCF network element to the SMF network element may be the set of feature indexes that is received by the PCF network element from the NWDA network element.

The set of feature indexes sent from the PCF network element to the SMF network element may alternatively be the set of feature indexes that corresponds to the service type of the service requested by the terminal device.

Optionally, the PCF network element may further send, to the SMF network element, at least one of the feature associated with the set of feature indexes, the service type information corresponding to the set of feature indexes, and the execution rule.

In a possible implementation, the PCF network element sends a response message of the request message in step 304 to the SMF network element. The response message includes the foregoing content sent from the PCF network element to the SMF network element.

For the response message, refer to the PDU-CAN session establishment/modification process in the prior art.

310: The SMF network element sends a set of feature indexes to the UPF network element.

The set of feature indexes that is sent from the SMF network element to the UPF network element may be the set of feature indexes that is received by the SMF network element.

Optionally, the SMF network element may further send, to the UPF network element, at least one of the feature associated with the set of feature indexes, the service type information corresponding to the set of feature indexes, and the execution rule.

In a possible implementation, in a session establishment/modification process that is initiated by the SMF network element to the UPF network element, the SMF network element sends the set of feature indexes to the UPF network element.

For step 309 and step 310, refer to step 204. Details are not described herein again.

311: The UPF network element receives user plane data and obtains, based on the received set of feature indexes, an eigenvector that is of the user plane data and that corresponds to the set of feature indexes.

For details, refer to step 205 and step 206. Details are not described herein again.

312: The UPF network element sends an eigenvector to the SMF network element.

The eigenvector sent from the UPF network element to the SMF network element may be the eigenvector obtained in step 311.

Optionally, the UPF network element may further send a number of the set of feature indexes to the SMF network element, where the set of feature indexes corresponds to the eigenvector.

In a possible implementation, in a process of a session establishment/modification response that is sent from the UPF network element to the SMF network element, the UPF network element sends the eigenvector to the SMF network element.

313: The SMF network element sends the received eigenvector to the NWDA network element through the PCF network element. Optionally, the SMF network element may further send the number of the set of feature indexes to the NWDA network element, where the set of the feature indexes corresponds to the eigenvector.

For this step, refer to step 207. Details are not described herein again.

314: The NWDA network element determines, based on the received eigenvector and a corresponding matching algorithm, service type information associated with the user plane data. For details, refer to the descriptions of step 208.

315: The NWDA network element sends a response result of the eigenvector to the UPF network element through the PCF network element and the SMF network element.

The response result may include the service type information and/or execution rule information of the user plane data.

In a possible implementation, the response result may include a result that the eigenvector agrees with a corresponding matching algorithm, or the response result may include a result indicating whether all eigenvectors agree with corresponding matching algorithms. The response result further includes a number of a set of feature indexes, where the set of the feature indexes corresponds to the eigenvector.

For details, refer to the descriptions of step 209.

316: The UPF network element processes the corresponding user plane data based on the response result.

For details, refer to the descriptions of steps 210 and 211.

Figure 4:
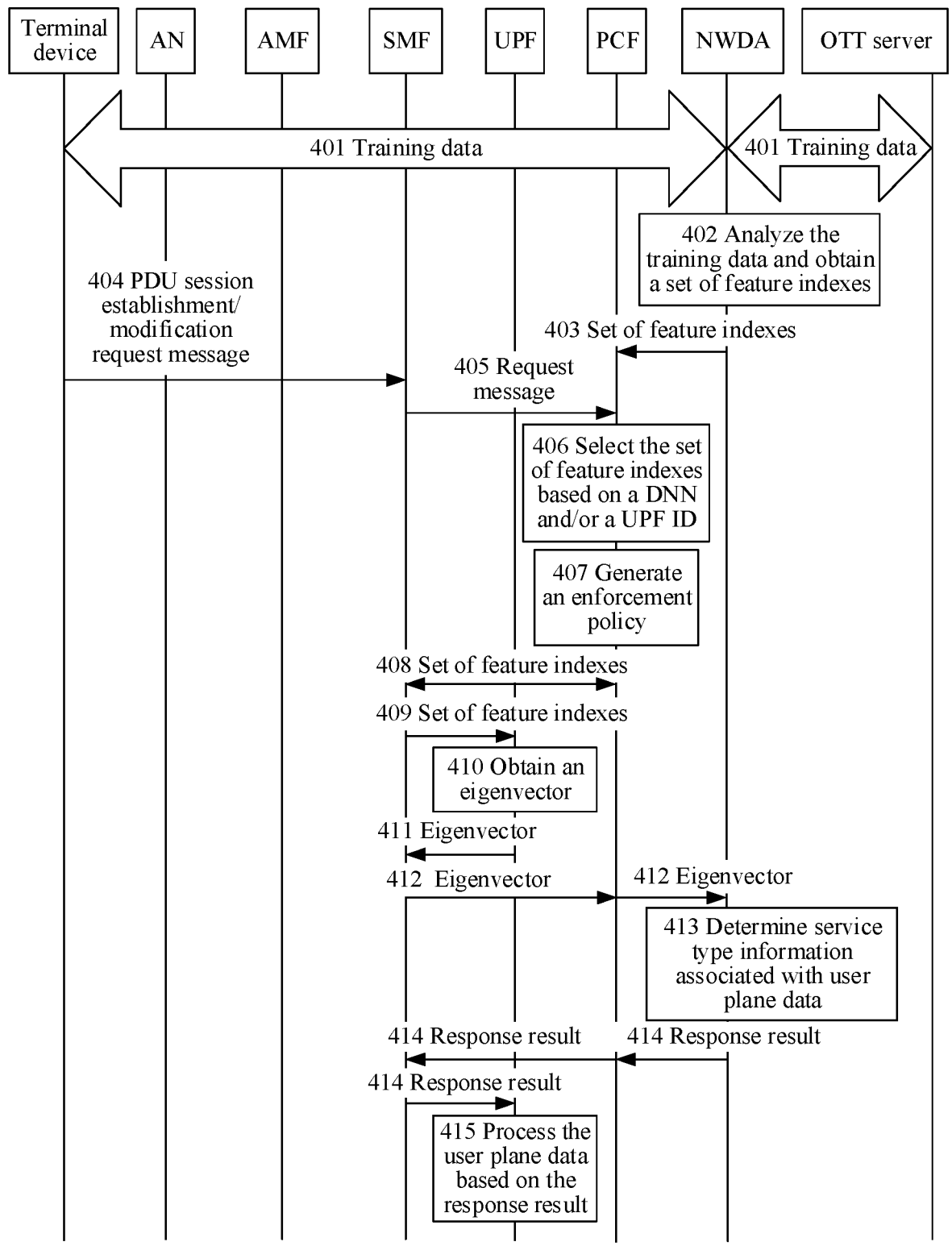
FIG. 4 is a schematic flowchart of a data analytics method according to a third embodiment of this application.

FIG. 4 is a schematic flowchart of a data analytics method according to a third embodiment of this application. The data analytics method in this embodiment includes the following steps.

401 and 402: For details, refer to the descriptions of step 301 and 302.

403: An NWDA network element sends a set of feature indexes to a PCF network element. The set of feature indexes is a set of feature indexes that is obtained, based on training data, by the NWDA network element in step 402. For a manner in which the NWDA network element sends the set of feature indexes to the PCF network element, specifically refer to the descriptions of step 203.

404 and 405: For details, refer to the descriptions of steps 303 and 304.

406: After receiving a request message sent from an SMF, the PCF network element selects a set of feature indexes, which is consistent with a DNN and/or a UPF ID that are/is of a current PDU session and that are/is sent by the SMF network element, from the set of feature indexes that is received in step 403. For how the PCF network element selects the set of feature indexes, refer to the method in which the NWDA network element selects the set of feature indexes in step 306.

This step is an optional step. When this step is not performed, step 407 may be directly performed.

407: The PCF network element generates an execution rule based on service type information.

For details, refer to the descriptions of step 308.

408: The PCF network element sends the set of feature indexes to the SMF network element.

In a possible implementation, when the PCF network element performs step 406, the PCF network element sends the set of feature indexes that is selected by the PCF network element in step 406 to the SMF network element. When the PCF network element does not perform step 406, the PCF network element sends a set of feature indexes that is preset by the PCF network element to the SMF network element. Optionally, the preset set of feature indexes may be a set of all feature indexes that is received by the PCF network element from the NWDA network element, or may be a set of feature indexes that is determined by the PCF network element based on a current network condition. The set of feature indexes sent from the PCF network element to the SMF network element may alternatively be a set of feature indexes that corresponds to a service type of a service requested by a terminal device.

Optionally, the PCF network element may further send, to the SMF network element, at least one of a feature associated with the set of feature indexes, the service type information corresponding to the set of feature indexes, and the execution rule.

In a possible implementation, the PCF network element sends a response message of the request message in step 405 to the SMF network element. The response message includes the foregoing content sent from the PCF network element to the SMF network element.

409 to 415: For details, refer to the descriptions of steps 310 to 316.

Figure 5:
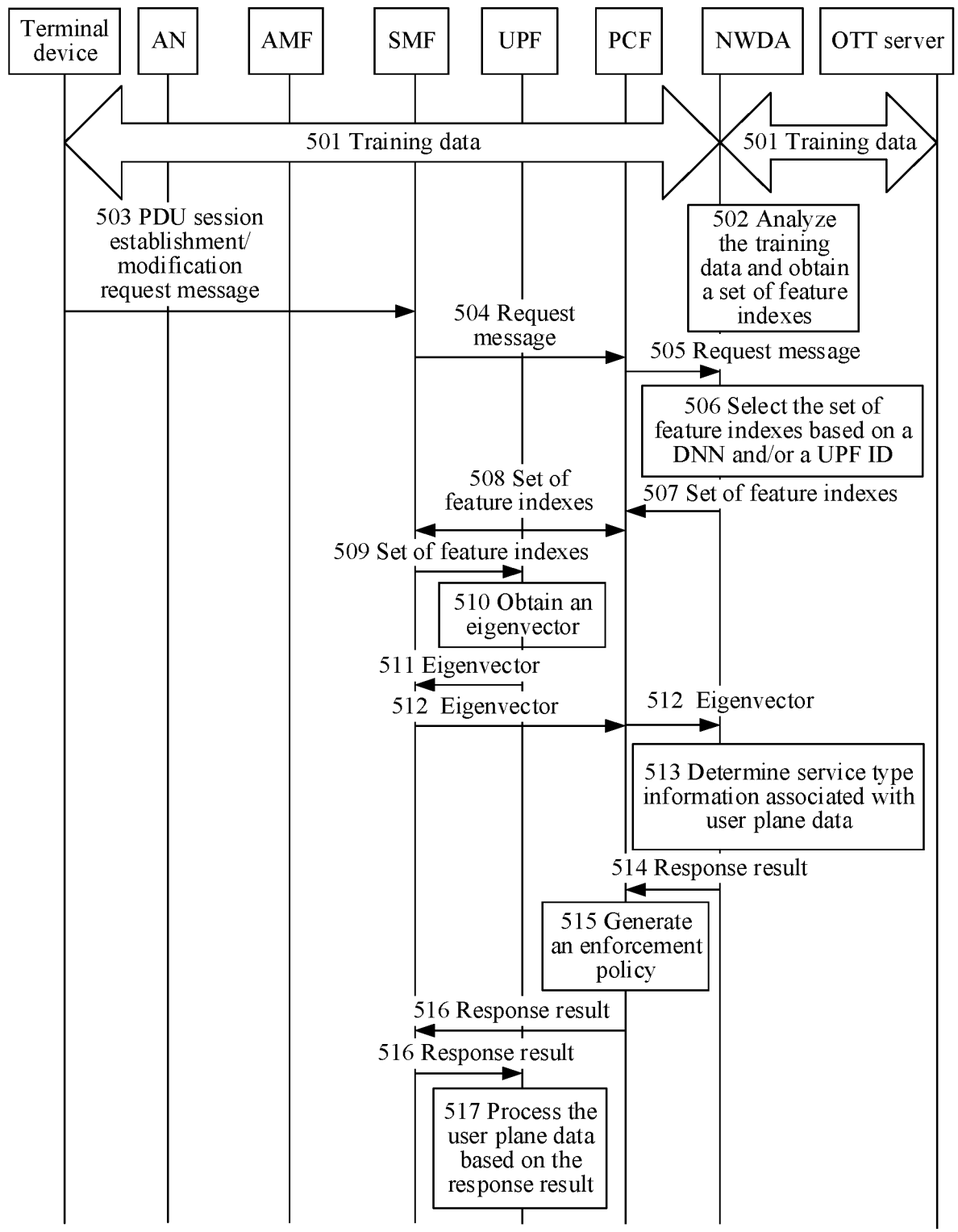
FIG. 5 is a schematic flowchart of a data analytics method according to a fourth embodiment of this application.

FIG. 5 is a schematic flowchart of a data analytics method according to a fourth embodiment of this application. The data analytics method in this embodiment includes the following steps.

501 to 507: For details, refer to the descriptions of steps 301 to 307.

508 to 513: For details, refer to the descriptions of steps 309 to 314.

514: An NWDA network element sends a response result of an eigenvector to a PCF network element.

The response result may include service type information of user plane data.

In a possible implementation, the response result may include a result indicating that the eigenvector agrees with a corresponding matching algorithm, or the response result may include a result indicating whether all eigenvectors agree with corresponding matching algorithms. The response result further includes a number of a set of feature indexes, where the set of the feature indexes corresponds to the eigenvector.

515: The PCF network element generates an execution rule based on the response result.

The PCF network element generates, based on the received service type information (for example, a service type), an execution rule corresponding to the service type (for example, a quality of service policy).

Optionally, the PCF network element may further select an execution rule from the generated execution rule and the execution rule received from the NWDA network element.

516: The PCF network element sends the response result to the UPF network element through the SMF network element.

The response result includes the service type information and/or the execution rule of the user plane data.

517: The UPF network element processes the corresponding user plane data based on the response result.

For details, refer to the descriptions of step 316.

Figure 6:
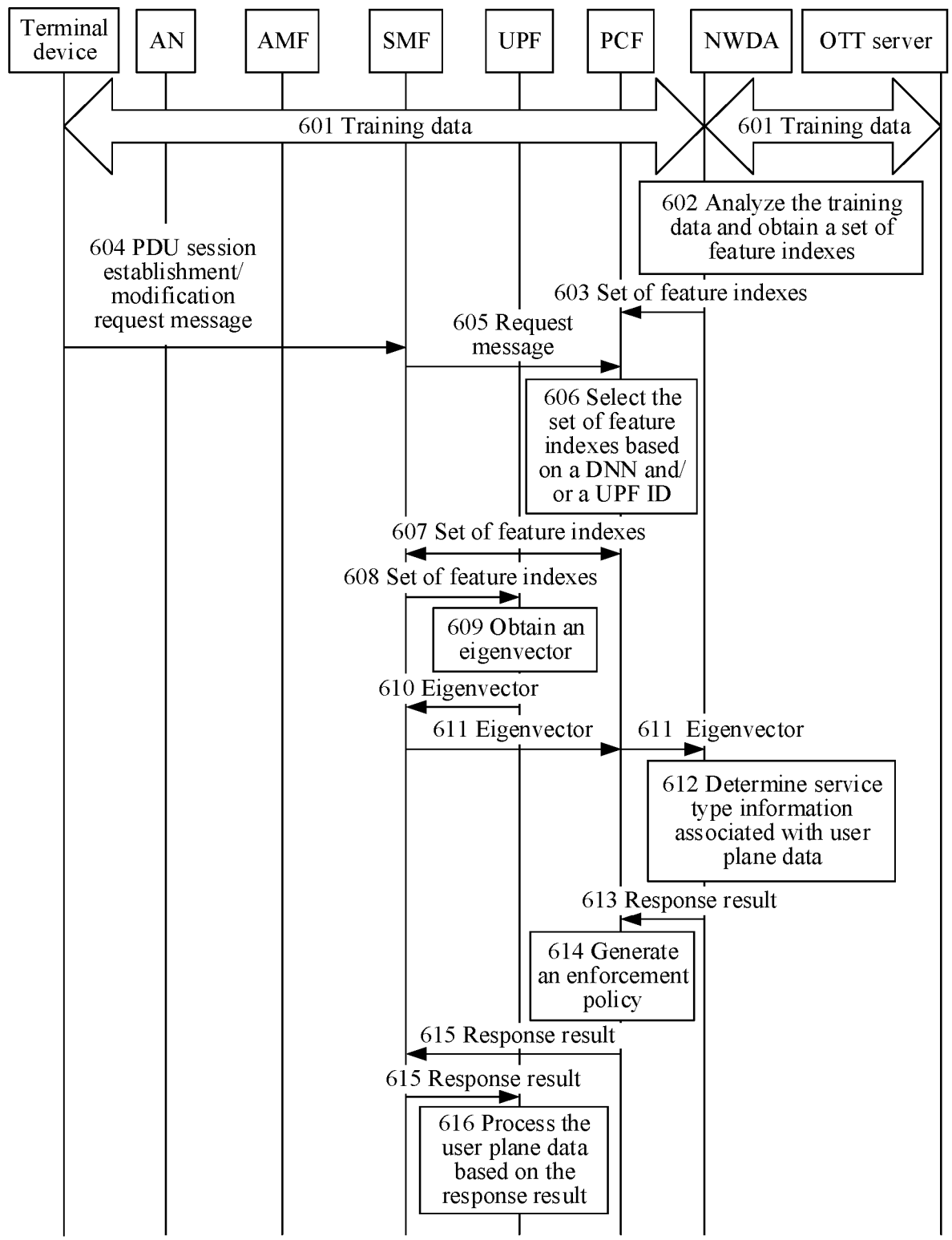
FIG. 6 is a schematic flowchart of a data analytics method according to a fifth embodiment of this application.

FIG. 6 is a schematic flowchart of a data analytics method according to a fifth embodiment of this application. The data analytics method in this embodiment includes the following steps.

601 to 606: For details, refer to the descriptions of steps 401 to 406.

607 to 612: For details, refer to the descriptions of steps 408 to 413.

613: An NWDA network element sends a response result of an eigenvector to a PCF network element.

The response result may include service type information of user plane data.

In a possible implementation, the response result may include a result indicating that the eigenvector agrees with a corresponding matching algorithm, or the response result may include a result indicating whether all eigenvectors agree with corresponding matching algorithms. The response result further includes a number of a set of feature indexes, where the set of the feature indexes corresponds to the eigenvector.

614: The PCF network element generates an execution rule based on the response result.

The PCF network element generates, based on the received service type information (for example, a service type), an execution rule corresponding to the service type (for example, a quality of service policy).

Optionally, the PCF network element may further select an execution rule from the generated execution rule and the execution rule received from the NWDA network element.

615: The PCF network element sends the response result to the UPF network element through the SMF network element.

The response result includes the service type information and/or the execution rule of the user plane data.

616: The UPF network element processes the corresponding user plane data based on the response result.

For details, refer to the descriptions of step 415.

In a possible implementation of this application, a feature extraction unit may be disposed in a user plane data processing network element or a data analytics network element. The feature extraction unit in the data analytics network element obtains, based on training data of a service type, information about a feature set of the service type, to obtain a feature parameter (for example, an eigenvector) corresponding to the training data. The feature extraction unit in the user plane data processing network element obtains user plane data and information about a feature set that are sent from the user plane data processing network element, and obtains, based on the obtained information of the feature set, a feature parameter (for example, an eigenvector) corresponding to the user plane data. The information about the feature set may be information about at least part of the at least one feature sets in information that is about at least one feature set and that is received by the user plane data processing network element. The feature extraction unit sends the obtained feature parameter to the user plane data processing network element. Optionally, the feature extraction unit in the user plane data processing network element may further obtain information associated with the user plane data, for example, a cell identifier of a terminal device. The feature extraction unit may further obtain a feature parameter corresponding to the information associated with the user plane data.

In another possible implementation of this application, only one feature extraction unit may be disposed. The feature extraction unit may be an independent network element, or the feature extraction unit may be disposed in the user plane data processing network element or another network element. This is not limited herein.

Figure 7:
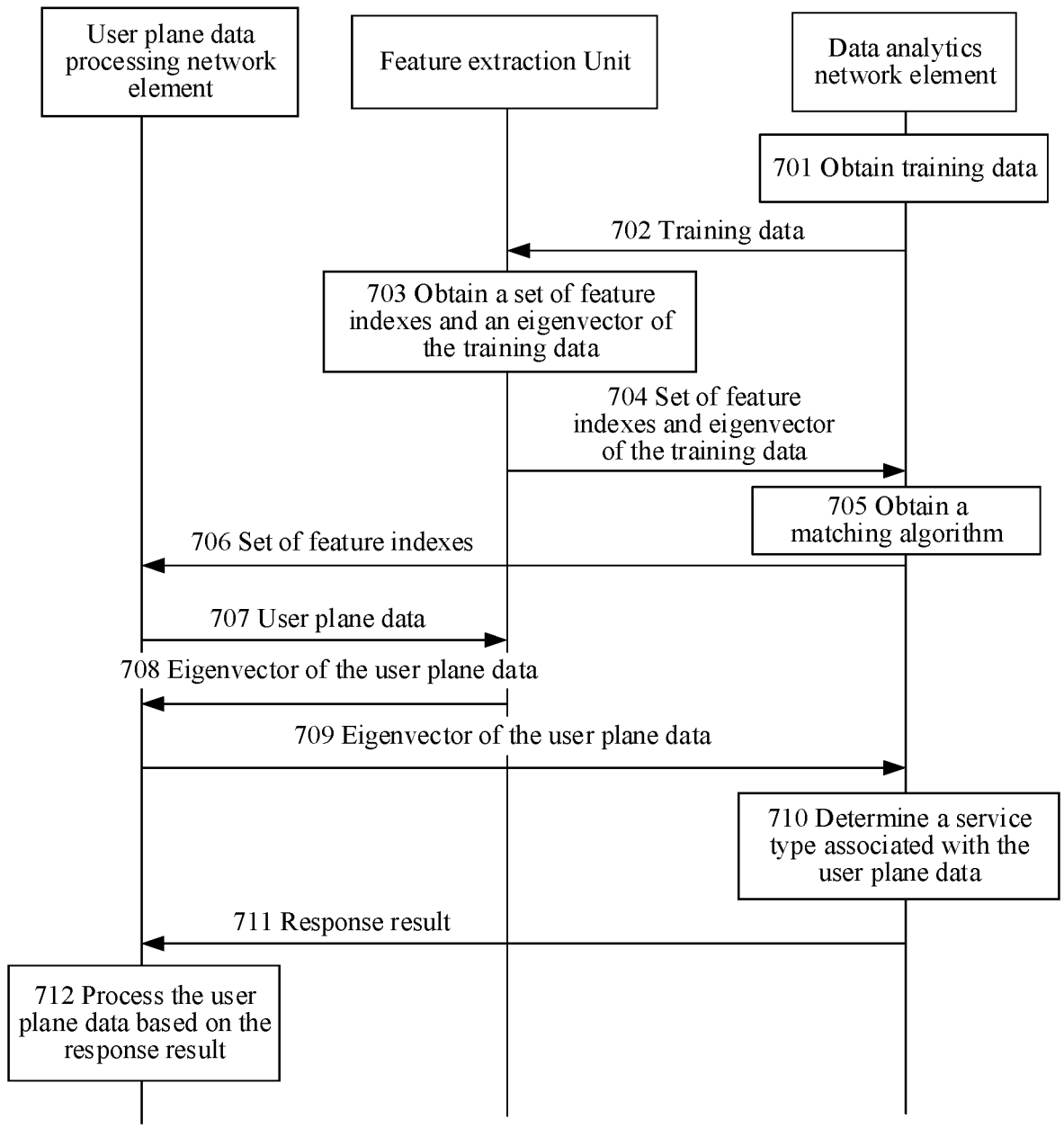
FIG. 7 is a schematic flowchart of a data analytics method according to a sixth embodiment of this application.

Examples in which the information about the feature set is a set of feature indexes, and the feature extraction unit is an independent network element are used below for description. FIG. 7 is a schematic flowchart of a data analytics method according to a sixth embodiment of this application. Only a user plane data processing network element, a feature extraction unit, and a data analytics network element are shown in the flowchart of this embodiment. For process interaction between the user plane data processing network element, the feature extraction unit, the data analytics network element, and another network element, refer to the embodiments in FIG. 2 to FIG. 6. This is not described herein again.

701: The data analytics network element obtains training data.

For details, refer to the descriptions of step 201.

702: The data analytics network element sends the training data to the feature extraction unit.

The training data sent from the data analytics network element to the feature extraction unit may be training data corresponding to a plurality of service types, or may be training data of one service type. The data analytics network element may actively send the training data to the feature extraction unit, or may send the training data based on a request of the feature extraction unit. In this embodiment, if the feature extraction unit is disposed in the user plane data processing network element, the feature extraction network element and the data analytics network element may exchange data with a session management network element through a policy control network element.

703: The feature extraction unit analyzes the training data, and obtains a set of feature indexes that corresponds to a service, and an eigenvector that is of the training data of the service type and that corresponds to the set of feature indexes.

For details, refer to step 202.

704: The feature extraction unit sends the eigenvector in step 703 to the data analytics network element.

Optionally, the feature extraction unit may further send the set of feature indexes in 703 to the data analytics network element.

In a possible implementation, the feature extraction unit may number the set of feature indexes and send a number to the data analytics network element. In another possible implementation, the feature extraction unit may alternatively send the service type corresponding to the set of feature indexes to the data analytics network element.

705: The data analytics network element obtains, based on an eigenvector of a service, a matching algorithm corresponding to the service.

The data analytics network element may obtain the matching algorithm by using a big data analytics method in the prior art. For content related to the matching algorithm, specifically refer to step 202.

706: The data analytics network element sends the received set of feature indexes to the user plane data processing network element.

Optionally, the set of feature indexes that is obtained by the feature extraction unit may alternatively be sent to the user plane data processing network element in another manner. For example, the feature extraction unit directly sends the obtained set of feature indexes to the user plane data processing network element.

For this step, specifically refer to steps 203 to 205.

707: After receiving user plane data, the user plane data processing network element sends the user plane data to the feature extraction unit.

Optionally, the user plane data processing network element may alternatively send a set of feature indexes that corresponds to the user plane data to the feature extraction unit.

708: The feature extraction unit obtains an eigenvector of the user plane data based on the received user plane data and the set of feature indexes. The feature extraction unit sends the obtained eigenvector corresponding to the user plane data to the user plane data processing network element.

Specifically, if the feature extraction unit has not received the set of feature indexes that corresponds to the user plane data, the feature extraction unit may obtain an eigenvector that is of the user plane data and that corresponds to a preset set of feature indexes. For example, the preset set of feature indexes may be a set of all feature indexes in the feature extraction unit.

709: The user plane data processing network element sends the eigenvector corresponding to the user plane data to the data analytics network element.

For details, refer to the descriptions of step 207.

710: The data analytics network element determines, based on the received eigenvector, service type information associated with the user plane data.

For details, refer to the descriptions of step 208.

711: The data analytics network element sends a response result of the eigenvector to the user plane data processing network element.

For details, refer to the descriptions of step 209.

712: The user plane data processing network element processes the user plane data based on the response result.

For details, refer to the descriptions of step 210 and step 211.

When feature extraction units are deployed in a plurality of network elements, if feature engineering needs to be maintained (for example, a version upgrade or a feature library upgrade), all network elements in which feature extraction units are deployed need to be maintained, and it is relatively complex for maintenance in such a deployment method. In this embodiment, only one feature extraction unit is disposed. When the feature engineering needs to be maintained, it is only required to maintain a network element in which the feature extraction unit is deployed. Therefore, it is simple and convenient for maintenance.

Figure 8:
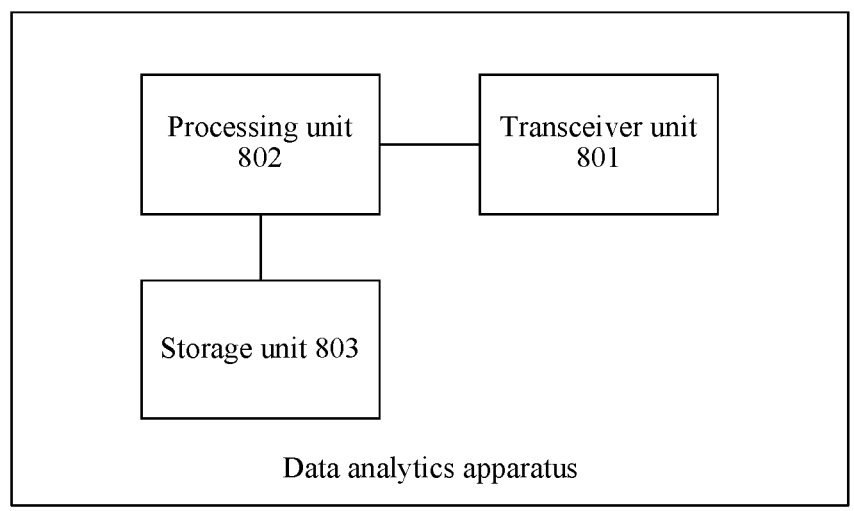
FIG. 8 is a schematic diagram of a data analytics apparatus according to an embodiment of this application.

FIG. 8 is a schematic diagram of a data analytics apparatus according to an embodiment of this application. The data analytics apparatus includes a transceiver unit 801, a processing unit 802, and a storage unit 803. The transceiver unit 801, the processing unit 802, and the storage unit 803 may be physically separated units, or may be integrated into one or more physical units. This is not limited herein.

The transceiver unit 801 is configured to implement content exchange between the processing unit 802 and another unit or network element. Specifically, the transceiver unit 801 may be a communications interface of the data analytics apparatus, may be a transceiver circuit or a transceiver, or may be a transceiver machine. The transceiver unit 801 may alternatively be a communications interface or a transceiver circuit of the processing unit 802. Optionally, the transceiver unit 801 may be a transceiver chip.

Although FIG. 8 shows only one transceiver unit 801, the data analytics apparatus may include a plurality of transceiver units 801 or the transceiver unit 801 includes a plurality of sub transceiver units. The transceiver unit 801 may further include a sending unit and a receiving unit.

The processing unit 802 is configured to implement data processing performed by the data analytics apparatus. The processing unit 802 may be a processing circuit or may be a processor. The processor may be a central processing unit (CPU), a network processor (NP), or a combination of a CPU and an NP. The processor may further include a hardware chip. The foregoing hardware chip may be an application-specific integrated circuit (ASIC), a programmable logic device (PLD), or a combination thereof. The foregoing PLD may be a complex programmable logic device (CPLD), a field programmable gate array (FPGA), a generic array logic (GAL), or any combination thereof.

Although FIG. 8 shows only one processing unit 802, the data analytics apparatus may include a plurality of processing units or the processing unit 802 includes a plurality of sub data processing units. Specifically, the processor may be a single-core (single-CPU) processor, or may be a multi-core (multi-CPU) processor.

The storage unit 803 is configured to store a computer instruction to be executed by the processing unit 802. The storage unit 803 may be a storage circuit or may be a memory. The memory may be a volatile memory or a non-volatile memory, or may include both of a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

The storage unit 803 may be a unit independent of the processing unit 802, or may be a storage unit in the processing unit 802. This is not limited herein. Although FIG. 8 shows only one storage unit 803, the data analytics apparatus may include a plurality of storage units 803 or the storage unit 803 includes a plurality of sub storage units.

In the embodiments of this application, the processing unit 802 may exchange content with another network element by using the transceiver unit 801. For example, the processing unit 802 obtains or receives content from the another network element. If the processing unit 802 and the transceiver unit 801 are two physically separated components, the processing unit 802 may exchange content with another unit within the data analytics apparatus without using the transceiver unit 801.

In a possible implementation, the transceiver unit 801, the processing unit 802, and the storage unit 803 may be connected to each other by using a bus. The bus may be a peripheral component interconnect (PCI) bus, an extended industry standard architecture (EISA) bus, or the like. The bus may be classified into an address bus, a data bus, a control bus, and the like.

In this embodiment of this application, the processing unit 802 enables, based on the computer instruction stored in the storage unit 803, the data analytics apparatus to implement the methods according to the first embodiment to the sixth embodiment of this application.

Specifically, the data analytics apparatus may be a user plane data processing network element, for example, a UPF network element or a base station. The data analytics apparatus may alternatively be a policy control network element, for example, a PCF network element. The data analytics apparatus may alternatively be a data analytics network element, for example, an NWDA network element.

When the data analytics apparatus is the user plane data processing network element, the transceiver unit 801 is configured to obtain information about at least one feature set from the data analytics network element, and is configured to receive user plane data, where information about each feature set in the information about the at least one feature set corresponds to at least one service type or at least one execution rule; the processing unit 802 is configured to obtain a feature parameter of the user plane data based on the information about the at least one feature set; the transceiver unit 801 is further configured to send the feature parameter to the data analytics network element and obtain a response result of the feature parameter from the data analytics network element; and the processing unit 802 is further configured to obtain, based on the response result, a service type associated with the user plane data or an execution rule associated with the user plane data.

The processing unit 802 is specifically configured to obtain, based on the response result, the execution rule associated with the user plane data from a policy control network element, or is specifically configured to obtain, based on the response result, the execution rule associated with the user plane data from the data analytics network element.

In a possible implementation, the processing unit 802 is further configured to process the user plane data based on the service type associated with the user plane data or the execution rule associated with the user plane data.

The processing unit 802 is specifically configured to forward the user plane data based on service priority information indicated in the execution rule associated with the user plane data; the processing unit 802 is specifically configured to add label information of the service type to the user plane data based on the service type associated with the user plane data or the execution rule associated with the user plane data; the processing unit 802 is specifically configured to add scheduling priority information to the user plane data based on the service type associated with the user plane data or the execution rule associated with the user plane data; or the processing unit 802 is specifically configured to perform charging statistics on the user plane data based on the service type associated with the user plane data or the execution rule associated with the user plane data.

The processing unit 802 is specifically configured to determine that a destination address of the user plane data is an address of a terminal device and that the terminal device is in an idle mode; and send paging priority information of the terminal device to a session management network element based on the service type associated with the user plane data or the execution rule associated with the user plane data.

In a possible implementation, the processing unit 802 is specifically configured to select information about part of the at least one feature sets from the information about the at least one feature set based on part of features; and obtain the feature parameter of the user plane data, where the feature parameter corresponds to the information about the part of the at least one feature sets.

The part of features include internet protocol IP 5-tuple information of the user plane data.

In a possible implementation, the transceiver unit 801 is further configured to obtain, based on the information about the at least one feature set, information associated with the user plane data from another user plane data processing network element or a control plane network element; and the processing unit 802 is specifically configured to obtain the feature parameter of the user plane data based on the information about the at least one feature set and the associated information.

In a possible implementation, the information about the feature set is a set of feature indexes, and the feature parameter is an eigenvector.

In this embodiment, the transceiver unit 801 is further configured to implement content receiving and sending operations of the user plane data processing network element with an external network element in the first embodiment to the sixth embodiment of this application. The processing unit 802 is further configured to implement a processing operation of data or signaling within the user plane data processing network element in the first embodiment to the sixth embodiment of this application. For example, the processing unit 802 is configured to implement processing operations in step 311 and step 316 in the second embodiment. In this embodiment, the processing unit 802 enables, based on the computer instruction stored in the storage unit 803, the user plane data processing network element to implement the operations performed by the user plane data processing network element in the first embodiment to the sixth embodiment of this application.

Specifically, in a possible implementation, the processing unit 802 obtains the information about the at least one feature set from the data analytics network element by using the transceiver unit 801, where the information about each feature set in the information about the at least one feature set corresponds to the at least one service type or the at least one execution rule; the processing unit 802 obtains the feature parameter of the user plane data based on the information about the at least one feature set; the processing unit 802 sends the feature parameter to the data analytics network element by using the transceiver unit 801; the processing unit 802 obtains the response result of the feature parameter from the data analytics network element by using the transceiver unit 801; and the processing unit 802 obtains, based on the response result, the service type associated with the user plane data or the execution rule associated with the user plane data.

In a possible implementation, the processing unit 802 obtains, by using the transceiver unit 801 based on the response result, the execution rule associated with the user plane data from the policy control network element; or the processing unit 802 obtains, by using the transceiver unit 801 based on the response result, the execution rule associated with the user plane data from the data analytics network element.

In a possible implementation, the processing unit 802 processes the user plane data based on the service type associated with the user plane data or the execution rule associated with the user plane data.

In a possible implementation, the processing unit 802 forwards the user plane data based on the service priority information indicated in the execution rule associated with the user plane data; the processing unit 802 adds the label information of the service type to the user plane data based on the service type associated with the user plane data or the execution rule associated with the user plane data; the processing unit 802 adds the scheduling priority information to the user plane data based on the service type associated with the user plane data or the execution rule associated with the user plane data; or the processing unit 802 performs charging statistics on the user plane data based on the service type associated with the user plane data or the execution rule associated with the user plane data.

In a possible implementation, the processing unit 802 determines that the destination address of the user plane data is the address of the terminal device and that the terminal device is in the idle mode; and the processing unit 802 sends, by using the transceiver unit 801, the paging priority information of the terminal device to the session management network element based on the service type associated with the user plane data or the execution rule associated with the user plane data.

In a possible implementation, the processing unit 802 selects the information about the part of the at least one feature sets from the information about the at least one feature set based on the part of features; and the processing unit 802 obtains the feature parameter of the user plane data, where the feature parameter corresponds to the information about the part of the at least one feature sets.

In a possible implementation, the processing unit 802 obtains, based on the information about the at least one feature set, the information associated with the user plane data from another user plane data processing network element or the control plane network element; and the processing unit 802 obtains the feature parameter of the user plane data based on the information about the at least one feature set and the associated information.

When the data analytics apparatus is the data analytics network element, the transceiver unit 801 is configured to send information about at least one feature set to a user plane data processing network element and receive a feature parameter of user plane data from the user plane data processing network element, where information about each feature set in the information about the at least one feature set corresponds to at least one service type or at least one execution rule, and the information about the at least one feature set includes information that is about a feature set and that corresponds to the feature parameter; and the processing unit 802 is configured to determine, based on the feature parameter, service type information associated with the user plane data or execution rule information associated with the user plane data.

In a possible implementation, the processing unit 802 is further configured to select, based on part of features, the information about the at least one feature set from pre-obtained information of a feature set.

The part of features include a data network name and/or identification information of a user plane function network element corresponding to a data network. The processing unit 802 is specifically configured to select, from the pre-obtained information of the feature set, information that is about a feature set and that is consistent with the data network name and/or the identification information of the user plane function network element corresponding to the data network.

In a possible implementation, the processing unit 802 is specifically configured to determine, based on the feature parameter and a matching algorithm corresponding to the feature parameter, the service type information associated with the user plane data or the execution rule information associated with the user plane data.

The service type information associated with the user plane data includes a service type associated with the user plane data or indication information of a service type.

In a possible implementation, the transceiver unit 801 is further configured to send a response result of the feature parameter to the user plane data processing network element, where the response result includes the service type information associated with the user plane data or the execution rule information associated with the user plane data.

In a possible implementation, the processing unit 802 is further configured to obtain the information about the at least one feature set based on training data; or the transceiver unit 801 is further configured to receive the information about the at least one feature set from a feature extraction unit.

In a possible implementation, the information about the feature set is a set of feature indexes, and the feature parameter is an eigenvector.

In this embodiment, the transceiver unit 801 is further configured to implement content receiving and sending operations of the data analytics network element with an external network element in the first embodiment to the sixth embodiment of this application. The processing unit 802 is further configured to implement a processing operation of data or signaling within the data analytics network element according to the first embodiment to the sixth embodiment of this application. For example, the processing unit 802 is configured to implement processing operations in step 302, step 306, and step 314 in the second embodiment.

In this embodiment, the processing unit 802 enables, based on the computer instruction stored in the storage unit 803, the data analytics network element to implement operations performed by the data analytics network element according to the first embodiment to the sixth embodiment of this application.

Specifically, in a possible implementation, the processing unit 802 sends the information about the at least one feature set to the user plane data processing network element by using the transceiver unit 801, where the information about each feature set in the information about the at least one feature set corresponds to the at least one service type or the at least one execution rule; the processing unit 802 receives the feature parameter of the user plane data from the user plane data processing network element by using the transceiver unit 801, where the information about the at least one feature set includes the information that is about the feature set and that corresponds to the feature parameter; and the processing unit 802 determines, based on the feature parameter, the service type information associated with the user plane data or the execution rule information associated with the user plane data.

In a possible implementation, the processing unit 802 selects, based on part of features, the information about the at least one feature set from the pre-obtained information of the feature set.

In a possible implementation, the part of features include the data network name and/or the identification information of the user plane function network element corresponding to the data network; and the processing unit 802 selects, from the pre-obtained information of the feature set, the information that is about the feature set and that is consistent with the data network name and/or the identification information of the user plane function network element corresponding to the data network.

In a possible implementation, the processing unit 802 determines, based on the feature parameter and the matching algorithm corresponding to the feature parameter, the service type information associated with the user plane data or the execution rule information associated with the user plane data.

In a possible implementation, the processing unit 802 sends the response result of the feature parameter to the user plane data processing network element by using the transceiver unit 801, where the response result includes the service type information associated with the user plane data or the execution rule information associated with the user plane data.

When the data analytics apparatus is the policy control network element, the processing unit 802 is configured to obtain information about at least one feature set from a data analytics network element by using the transceiver unit 801, where information about each feature set in the information about the at least one feature set corresponds to at least one service type or at least one execution rule; and the processing unit 802 is further configured to send, by using the transceiver unit 801, information about at least part of the at least one feature sets in the information about the at least one feature set to a user plane data processing network element.

In a possible implementation, the processing unit 802 is further configured to select, based on part of features, the information about the at least part of the at least one feature sets from the information about the at least one feature set.

The part of features include a data network name and/or identification information of a user plane function network element corresponding to a data network. The processing unit is specifically configured to select, from the information about the at least one feature set, information that is about a feature set and that is consistent with the data network name and/or the identification information of the user plane function network element corresponding to the data network.

In a possible implementation, the transceiver unit 801 is further configured to send service type information corresponding to the information about the at least part of the at least one feature sets to the user plane data processing network element.

In a possible implementation, the transceiver unit 801 is further configured to send an execution rule corresponding to the information about the at least part of the at least one feature sets to the user plane data processing network element.

In a possible implementation, the transceiver unit 801 is further configured to obtain the service type information corresponding to the information about the at least part of the at least one feature sets from the data analytics network element; the processing unit 802 is further configured to generate, based on the obtained service type information, the execution rule corresponding to the information about the at least part of the at least one feature sets; and the transceiver unit 801 is further configured to send the execution rule corresponding to the information about the at least part of the at least one feature sets to the user plane data processing network element.

In a possible implementation, the information about the feature set is a set of feature indexes, and the feature parameter is an eigenvector.

In this embodiment, the transceiver unit 801 is further configured to implement content receiving and sending operations of the policy control network element with an external network element in the first embodiment to the sixth embodiment of this application. The processing unit 802 is further configured to implement a processing operation of data or signaling within the policy control network element in the first embodiment to the sixth embodiment of this application. For example, the processing unit 802 is configured to implement the processing operation in step 308 in the second embodiment.

In this embodiment, the processing unit 802 enables, based on the computer instruction stored in the storage unit 803, the policy control network element to implement the operations performed by the policy control network element in the first embodiment to the sixth embodiment of this application.

Specifically, in a possible implementation, the processing unit 802 obtains the information about the at least one feature set from the data analytics network element by using the transceiver unit 801, where the information about each feature set in the information about the at least one feature set corresponds to the at least one service type or the at least one execution rule; and the processing unit 802 sends the information about the at least part of the at least one feature sets in the information about the at least one feature set to the user plane data processing network element by using the transceiver unit 801.

In a possible implementation, the processing unit 802 selects, based on the part of features, the information about the at least part of the at least one feature sets from the information about the at least one feature set.

In a possible implementation, the part of features include the data network name and/or the identification information of the user plane function network element corresponding to the data network; and the processing unit 802 selects, from the information about the at least one feature set, the information that is about the feature set and that is consistent with the data network name and/or the identification information of the user plane function network element corresponding to the data network.

In a possible implementation, the processing unit 802 sends the service type information corresponding to the information about the at least part of the at least one feature sets to the user plane data processing network element by using the transceiver unit 801.

In a possible implementation, the processing unit 802 sends the execution rule corresponding to the information about the at least part of the at least one feature sets to the user plane data processing network element by using the transceiver unit 801.

In a possible implementation, by using the transceiver unit 801, the processing unit 802 obtains the service type information corresponding to the information about the at least part of the at least one feature sets from the data analytics network element; the processing unit 802 generates, based on the obtained service type information, the execution rule corresponding to the information about the at least part of the at least one feature sets; and the processing unit 802 sends the execution rule corresponding to the information about the at least part of the at least one feature sets to the user plane data processing network element by using the transceiver unit 801.

In the embodiments of this application, for ease of understanding, a plurality of examples are used for description. However, these examples are merely examples, and it does not mean that the examples are optimal implementations for implementing this application.

In the embodiments of this application, for ease of descriptions, names of a request message, a response message, and other messages are used. However, these messages are merely used to describe, by using examples, content that needs to be carried or a function that needs to be implemented, and specific names of the messages are not intended to limit this application. For example, the names of the messages may alternatively be a first message, a second message, a third message, or the like. These messages may be some specific messages, or may be some fields in the messages. These messages may further represent various service operations.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing described system, apparatus, and unit, refer to a corresponding process in the foregoing method embodiments, and this is not limited herein.

In the several embodiments provided in this application, it should be understood that the disclosed system, apparatus, and method may be implemented in other manners. For example, the foregoing described apparatus embodiment is merely an example. For example, the unit division is merely logical function division and may be other division in actual implementation. For example, a plurality of units or components may be combined or integrated into another system, or part of features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data analytics method, comprising:
    receiving, by a user plane function (UPF), information about at least one feature set from a network data analytics (NWDA) having a data analytics function, wherein information about each feature set in the information about the at least one feature set corresponds to at least one service type;
    receiving, by the UPF, user plane data and determining a feature parameter of the user plane data based on the information about the at least one feature set;
    sending, by the UPF, the feature parameter to the NWDA;
    in response to sending the feature parameter to the NWDA, receiving, by the UPF, a response result of the feature parameter from the NWDA;
    obtaining, by the UPF based on the response result, a service type associated with the user plane data; and
    processing, by the UPF, the user plane data based on the service type associated with the user plane data, wherein processing the user plane data comprises:
        determining, by the UPF, that a destination address of the user plane data is an address of a terminal device and that the terminal device is in an idle mode; and
        sending, by the UPF, paging priority information of the terminal device to a session management function (SMF) based on the service type associated with the user plane data.

2. The method according to claim 1, wherein obtaining, by the UPF based on the response result, the service type associated with the user plane data comprises:
    obtaining, by the UPF based on the response result, an execution rule associated with the user plane data from a policy control function (PCF); or
    obtaining, by the UPF based on the response result, the execution rule associated with the user plane data from the NWDA.

3. The method according to claim 1, wherein processing, by the UPF, the user plane data based on the service type associated with the user plane data comprises at least one of:
forwarding, by the UPF, the user plane data based on service priority information indicated in an execution rule associated with the user plane data;
adding, by the UPF, label information of the service type to the user plane data based on the service type associated with the user plane data or the execution rule associated with the user plane data;
adding, by the UPF, scheduling priority information to the user plane data based on the service type associated with the user plane data or the execution rule associated with the user plane data; or
performing, by the UPF, charging statistics on the user plane data based on the service type associated with the user plane data or the execution rule associated with the user plane data.

4. The method according to claim 1, wherein the response result comprises at least one of service type information associated with the user plane data or execution rule information associated with the user plane data.

5. The method according to claim 1, wherein determining the feature parameter of the user plane data based on the information about the at least one feature set comprises:
selecting, by the UPF, information about part of the at least one feature set from the information about the at least one feature set based on part of features; and
determining, by the UPF, the feature parameter of the user plane data that corresponds to the information about the part of the at least one feature set.

6. The method according to claim 5, wherein the part of features comprise internet protocol (IP) 5-tuple information of the user plane data.

7. The method according to claim 1, wherein the method further comprises:
obtaining, by the UPF based on the information about the at least one feature set, information associated with the user plane data from another UPF or a control plane function; and
wherein determining the feature parameter of the user plane data based on the information about the at least one feature set comprises:
determining, by the UPF, the feature parameter of the user plane data based on the information about the at least one feature set and the information associated with the user plane data.

8. The method according to claim 1, wherein:
the UPF comprises a feature extraction unit; and
determining the feature parameter of the user plane data based on the information about the at least one feature set comprises:
determining, by the feature extraction unit, the feature parameter of the user plane data based on information about at least part of the at least one feature set in the information about the at least one feature set.

9. The method according to claim 1, wherein the information about the feature set is a set of feature indexes.

10. The method according to claim 1, wherein the feature parameter is a set of eigenvalues.

11. An apparatus, comprising:
at least one processor; and
a memory coupled to the at least one processor and storing programming instructions for execution by the at least one processor, wherein the apparatus includes a user plane function (UPF), and wherein the programming instructions instruct the processor to perform operations comprising:
receiving, by the UPF, information about at least one feature set from a network data analytics (NWDA) having a data analytics function, wherein information about each feature set in the information about the at least one feature set corresponds to at least one service type;
receiving, by the UPF, user plane data and determining a feature parameter of the user plane data based on the information about the at least one feature set;
sending, by the UPF, the feature parameter to the NWDA;
in response to sending the feature parameter to the NWDA, receiving, by the UPF, a response result of the feature parameter from the NWDA;
obtaining, by the UPF based on the response result, a service type associated with the user plane data; and
processing, by the UPF, the user plane data based on the service type associated with the user plane data, wherein processing the user plane data comprises:
determining, by the UPF, that a destination address of the user plane data is an address of a terminal device and that the terminal device is in an idle mode; and
sending, by the UPF, paging priority information of the terminal device to a session management function (SMF) based on the service type associated with the user plane data.

12. The apparatus according to claim 11, wherein obtaining, based on the response result, the service type associated with the user plane data comprises:
obtaining, based on the response result, an execution rule associated with the user plane data from a policy control function (PCF); or
obtaining, based on the response result, the execution rule associated with the user plane data from the NWDA.

13. The apparatus according to claim 11, wherein processing the user plane data based on the service type associated with the user plane data comprises at least one of:
forwarding the user plane data based on service priority information indicated in an execution rule associated with the user plane data;
adding label information of the service type to the user plane data based on the service type associated with the user plane data or the execution rule associated with the user plane data;
adding scheduling priority information to the user plane data based on the service type associated with the user plane data or the execution rule associated with the user plane data; or
performing charging statistics on the user plane data based on the service type associated with the user plane data or the execution rule associated with the user plane data.

14. The apparatus according to claim 11, wherein the response result comprises at least one of service type information associated with the user plane data or execution rule information associated with the user plane data.

15. The apparatus according to claim 11, wherein determining the feature parameter of the user plane data based on the information about the at least one feature set comprises:
selecting information about part of the at least one feature set from the information about the at least one feature set based on part of features; and determining the feature parameter of the user plane data that corresponds to the information about the part of the at least one feature set.

16. A system, comprising:
a data analytics apparatus comprising at least one first processor and a first memory coupled to the at least one first processor and storing first programming instructions for execution by the at least one first processor, wherein the data analytics apparatus includes a network data analytics (NWDA) having a data analytics function, and wherein the first programming instructions instruct the at least one first processor to send, by the NWDA, information about at least one feature set to a user plane data processing apparatus, wherein the user plane data processing apparatus includes a user plane function (UPF), and wherein information about each feature set in the information about the at least one feature set corresponds to at least one service type; and
the user plane data processing apparatus comprising at least one second processor and a second memory coupled to the at least one second processor and storing second programming instructions for execution by the at least one second processor to:
  receive, by the UPF, the information about the at least one feature set from the NWDA;
  receive, by the UPF, user plane data and determine a feature parameter of the user plane data based on the information about the at least one feature set;
  send, by the UPF, the feature parameter to the NWDA;
  in response to sending the feature parameter to the NWDA, receive, by the UPF, a response result of the feature parameter from the NWDA;
  obtain, by the UPF based on the response result, a service type associated with the user plane data; and
  process, by the UPF, the user plane data based on the service type associated with the user plane data, wherein processing the user plane data comprises:
    determining, by the UPF, that a destination address of the user plane data is an address of a terminal device and that the terminal device is in an idle mode; and
    sending, by the UPF, paging priority information of the terminal device to a session management function (SMF) based on the service type associated with the user plane data.

17. The system according to claim 16, wherein the information about the feature set is a set of feature indexes.

18. The system according to claim 16, wherein the feature parameter is a set of eigenvalues.

* * * * *